United States Patent
Gupta et al.

(10) Patent No.: US 10,604,161 B2
(45) Date of Patent: *Mar. 31, 2020

(54) SYSTEM AND METHOD FOR PROVIDING DRIVING ASSISTANCE TO SAFELY OVERTAKE A VEHICLE

(71) Applicant: SONY CORPORATION, Tokyo (JP)

(72) Inventors: Manish Gupta, Karnataka (IN); Ramesha Chelur Ramachandra Sastry, Karnataka (IN); Pramod Chintalapoodi, Chicago, IL (US); Sho Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,023

(22) Filed: Aug. 10, 2018

(65) Prior Publication Data
US 2018/0345992 A1 Dec. 6, 2018

Related U.S. Application Data

(63) Continuation of application No. 14/856,737, filed on Sep. 17, 2015, now Pat. No. 10,071,748.

(51) Int. Cl.
| | |
|---|---|
| *G08G 1/056* | (2006.01) |
| *B60W 50/14* | (2020.01) |
| *B62D 15/02* | (2006.01) |
| *G08G 1/16* | (2006.01) |
| *B60K 35/00* | (2006.01) |

(52) U.S. Cl.
CPC .......... *B60W 50/14* (2013.01); *B60K 35/00* (2013.01); *B62D 15/0265* (2013.01);
(Continued)

(58) Field of Classification Search
CPC ........ G08G 1/166; G08G 1/165; G08G 1/167; G08G 1/163; B60R 21/0134; B60R 1/00;
(Continued)

(56) References Cited

U.S. PATENT DOCUMENTS

| | | | |
|---|---|---|---|
| 10,071,748 B2 * | 9/2018 | Gupta | B60K 35/00 |
| 2005/0060117 A1 * | 3/2005 | Kunzler | G01S 13/586 |
| | | | 702/149 |

(Continued)

FOREIGN PATENT DOCUMENTS

| | | |
|---|---|---|
| JP | 2006-284458 A | 10/2006 |
| JP | 2010-070061 A | 4/2010 |

(Continued)

OTHER PUBLICATIONS

International Search Report of PCT Application No. PCT/JP2016/004040, dated Nov. 24, 2016, 4 pages.

(Continued)

*Primary Examiner* — Daniel Previl
(74) *Attorney, Agent, or Firm* — Chip Law Group

(57) ABSTRACT

Various aspects of a system and method to provide driving assistance to safely overtake a vehicle are disclosed herein. In accordance with an embodiment, an electronic control unit used in a first vehicle is configured to detect a second vehicle in front of the first vehicle. A first position associated with the first vehicle and a second position associated with the detected second vehicle is determined for a first time instance. It may be determined whether a lateral distance between the determined first position and the determined second position is below a pre-defined threshold distance. A first alert is generated when the determined lateral distance is below the pre-defined threshold distance.

19 Claims, 13 Drawing Sheets

(52) U.S. Cl.
CPC ............. *G08G 1/163* (2013.01); *G08G 1/166* (2013.01); *G08G 1/167* (2013.01); *B60W 2050/143* (2013.01); *B60W 2050/146* (2013.01); *B60W 2520/10* (2013.01); *B60W 2520/14* (2013.01); *B60W 2540/18* (2013.01); *B60W 2550/22* (2013.01); *B60W 2550/302* (2013.01); *B60W 2550/306* (2013.01); *B60W 2550/308* (2013.01)

(58) Field of Classification Search
CPC ........... B60R 2021/01259; B60R 2021/01265; B60R 21/013; B60R 2300/107; B60R 2300/205; B60R 2300/301; B60R 2300/302; B60R 2300/308; B62D 15/0265; G02B 2027/014; G02B 27/01; G02B 2027/0138; G02B 2027/0141; G02B 2027/0187; G02B 27/00; G02B 6/001; B60K 35/00; B60Q 1/2615; B60Q 1/2696; B60Q 1/30; B60Q 1/32; B60Q 9/008; B60T 7/22; B60W 2550/302; B60W 2550/304; B60W 2550/306; B60W 2550/308; B60W 30/08; B60W 30/0956; B60W 30/18163; B60W 50/14; B62J 6/04; B62J 6/16; F21S 4/00; G01S 13/586; G01S 13/931; G01S 2013/9325; G01S 2013/9375; G06F 3/00; G06Q 20/3224; G06Q 20/40; G06T 19/006
USPC ....... 340/935, 436, 936, 938, 929, 901–907, 340/915–920, 995.1, 426.25, 435, 463
See application file for complete search history.

(56) References Cited

U.S. PATENT DOCUMENTS

| | | | |
|---|---|---|---|
| 2005/0090950 A1* | 4/2005 | Sawamoto | G08G 1/166 701/23 |
| 2005/0114000 A1 | 5/2005 | Cashler | |
| 2009/0192710 A1* | 7/2009 | Eidehall | B62D 15/0265 701/301 |
| 2010/0030473 A1* | 2/2010 | Au | G01S 17/936 701/301 |
| 2011/0238309 A1* | 9/2011 | Tsunekawa | B60R 21/0134 701/301 |
| 2012/0169513 A1 | 7/2012 | Szczerba et al. | |
| 2013/0148375 A1 | 6/2013 | Connor | |
| 2013/0151412 A1 | 6/2013 | Spahl et al. | |
| 2014/0067250 A1 | 3/2014 | Bone et al. | |
| 2014/0092134 A1 | 4/2014 | Nagasawa et al. | |
| 2014/0257659 A1* | 9/2014 | Dariush | G08G 1/166 701/70 |
| 2015/0224988 A1 | 8/2015 | Buerkle et al. | |

FOREIGN PATENT DOCUMENTS

| | | |
|---|---|---|
| JP | 2012-066690 A | 4/2012 |
| JP | 2012-224316 A | 11/2012 |
| JP | 2013-196359 A | 9/2013 |
| JP | 2014-071019 A | 4/2014 |
| WO | 12160590 A1 | 11/2012 |

OTHER PUBLICATIONS

Notice of Allowance and Fees Due for U.S. Appl. No. 14/856,737, dated May 4, 2018,07 pages.

Non-Final Rejection for U.S. Appl. No. 14/856,737, dated Nov. 7, 2017, 10 pages.

Advisory Action for U.S. Appl. No. 14/856,737, dated Jul. 20, 2017, 03 pages.

Final Rejection for U.S. Appl. No. 14/856,737, dated May 10, 2017, 11 pages.

Non-Final Rejection for U.S. Appl. No. 14/856,737, dated Oct. 27, 2016, 09 pages.

* cited by examiner

SYSTEM AND METHOD FOR PROVIDING DRIVING ASSISTANCE TO SAFELY OVERTAKE A VEHICLE

CROSS-REFERENCES TO RELATED APPLICATIONS

The present application is a continuation application of U.S. patent application Ser. No. 14/856,737, filed Sep. 17, 2015, the entire contents of which are hereby incorporated by reference.

FIELD

Various embodiments of the disclosure relate to providing of driving assistance. More specifically, various embodiments of the disclosure relate to providing driving assistance to safely overtake a vehicle.

BACKGROUND

Advancements in the field of automotive electronics have extended the functionality of various assistance systems and associated applications. Assistance systems, such as a driving assistance system, are rapidly evolving with respect to their utility as a practical information resource to assist in different traffic conditions.

In certain scenarios, it may be difficult for a driver of a motor vehicle to make an accurate judgment to maintain a safe distance from other vehicles, such as a bicycle. For example, when the driver of the motor vehicle overtakes the bicycle, the driver should maintain a specified, safe distance between the motor vehicle and the bicycle, and/or its rider. In some jurisdictions of the United States of America, failure to maintain the specified, safe distance is a traffic offence with an imposition of a fine. Moreover, the bicycle rider may be intimidated when the motor vehicle overtakes the bicycle at a high speed. Often, the driver has to make an approximate guess to maintain the specified, safe distance. Further, traffic rules to maintain the safe distance and/or a safe speed limit may vary even in different areas of a single country. At times, the driver's guess may not be accurate, which may result in an accident and/or a violation of the specified, safe distance requirement according to the jurisdiction. Thus, an enhanced and preemptive driving assistance may be required to ensure a safe overtake.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to provide driving assistance to safely overtake a vehicle substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
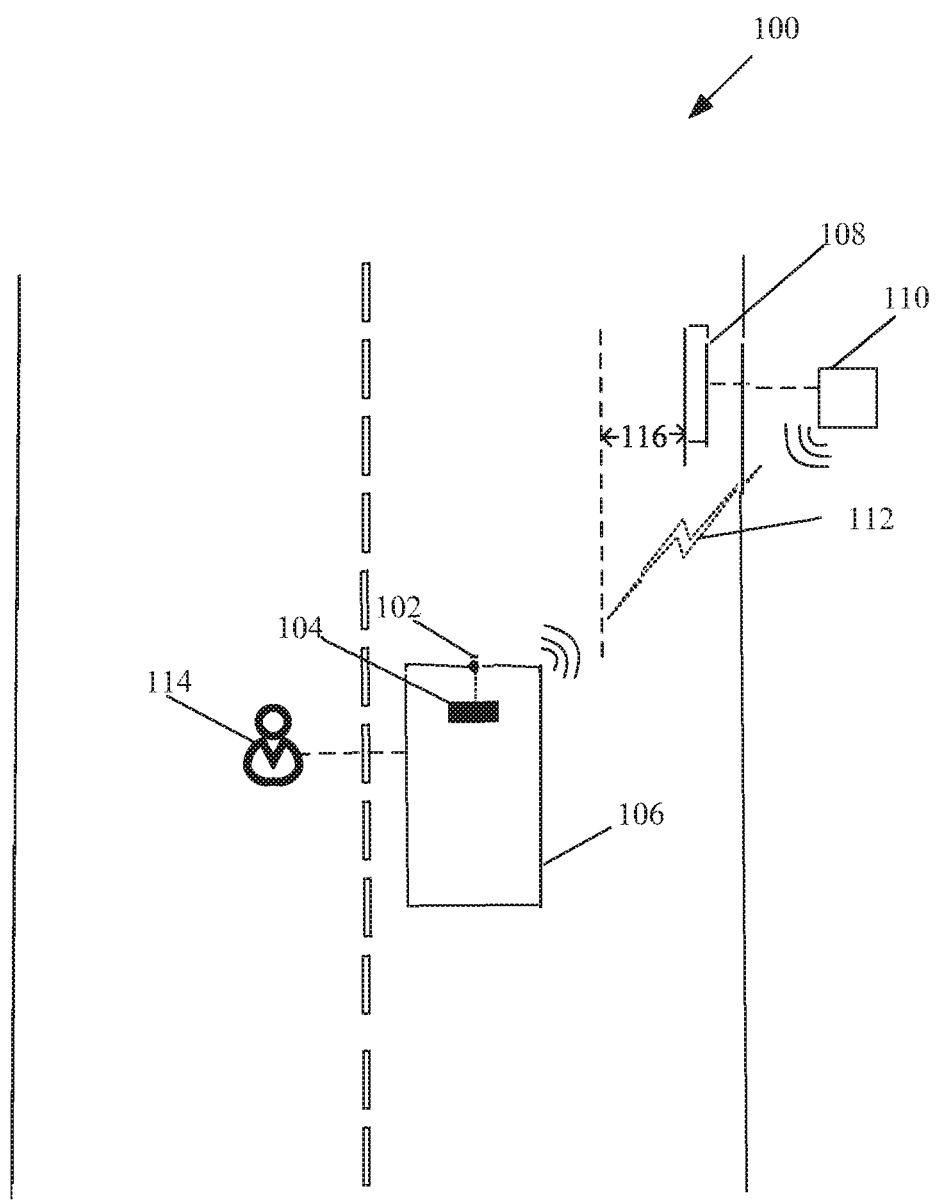
FIG. 1 is a block diagram that illustrates a system configuration to provide driving assistance to safely overtake a vehicle, in accordance with an embodiment of the disclosure.

The following described implementations may be found in the disclosed system and method to provide driving assistance to safely overtake a vehicle. Exemplary aspects of the disclosure may comprise a method that may detect a second vehicle in front of a first vehicle. A first position associated with the first vehicle and a second position associated with the detected second vehicle may be determined. Such determination may occur at a first time instance. It may be determined whether a lateral distance between the determined first position and the determined second position is below a first pre-defined threshold distance. A first alert may be generated when the determined lateral distance is below the first pre-defined threshold distance.

In accordance with an embodiment, the first alert may be generated when the determined lateral distance is below the first pre-defined threshold distance and above another pre-defined threshold distance. A crash alert may be generated when the determined lateral distance is below another pre-defined threshold distance. The first vehicle may be a motor vehicle. The detected second vehicle may be a bicycle, a motorcycle, an electric personal assistive mobility device (EPAMD), a person riding a horse, a person driving an animal drawn vehicle, a pedestrian, a vehicle propelled by human power, or other non-motorized vehicle. An image-capturing unit, a radio wave-based object detection device, a laser-based object detection device, and/or a wireless communication device, may be utilized for the detection of the second vehicle.

In accordance with an embodiment, the first time instance may correspond to a time instance when the first vehicle is predicted to pass the detected second vehicle. It may be determined whether a relative speed between the first vehicle and the detected second vehicle at the first time instance is above a pre-defined threshold speed. In accordance with an embodiment, the first pre-defined threshold distance may be dynamically updated based on a geo-location of the first vehicle. In accordance with an embodiment, the first pre-defined threshold distance may be dynamically updated based on the determined relative speed and/or the geo-location of the first vehicle.

In accordance with an embodiment, the first alert may be generated when the determined relative speed is above the pre-defined threshold speed. The generated first alert may indicate that the first vehicle cannot safely pass the detected second vehicle along the first predictive path. The first alert may be generated when the determined lateral distance is below the first pre-defined threshold distance or the determined relative speed is above the pre-defined threshold speed. The generated first alert may indicate violation of a law, an ordinance, and/or a regulation. The generated first alert may comprise visual information, haptic information, and/or audio information. In accordance with an embodiment, display of the generated first alert in the first vehicle may be controlled. The display may be controlled by use of a heads-up display (HUD), an augmented reality (AR)-HUD, a driver information console (DIC), a see-through display, or a smart-glass display.

In accordance with an embodiment, the first position may be determined along a first predictive path associated with the first vehicle. A second position may be determined along a second predictive path associated with the detected second vehicle. First sensor data may be received to determine the first predictive path. The first sensor data may correspond to the first vehicle. A second sensor data may be received for the determination of the second predictive path. The second sensor data may correspond to the detected second vehicle. In accordance with an embodiment, the second sensor data may be received from a communication device associated with the second vehicle.

In accordance with an embodiment, the first sensor data may comprise a steering angle, a yaw rate, a geographical location, and/or speed of the first vehicle. The second sensor data may comprise a relative displacement, the relative speed, and/or a detected angle between the first vehicle and the detected second vehicle. The first sensor data may be received from a sensing system used in the first vehicle. The second sensor data may be received from a communication device associated with the second vehicle or an object detection device of the sensing system.

In accordance with an embodiment, a second alert may be generated that may indicate that the first vehicle can safely pass the detected second vehicle along the first predictive path. The second alert may be generated when the determined lateral distance is above the first pre-defined threshold distance and the determined relative speed is below the pre-defined threshold speed.

In accordance with an embodiment, a third vehicle may be detected in an adjacent lane. The adjacent lane may correspond to oncoming traffic, with respect to a direction of movement of the first vehicle. A third position associated with the detected third vehicle may be determined along a third predictive path associated with the third vehicle in the adjacent lane. The third position may be determined at a second time instance when the first vehicle is predicted to overtake the second vehicle and pass the third vehicle.

In accordance with an embodiment, it may be determined whether a distance between the determined third position and the determined first position is above a second pre-defined threshold distance. A third alert may be generated that may indicate that the first vehicle can safely pass the detected second vehicle along the first predictive path, within a first time period. The third alert may be generated when the determined lateral distance is above the first pre-defined threshold distance, the determined relative speed is below the pre-defined threshold speed, and the determined distance is above the second pre-defined threshold distance. The first time period is determined based on the determined distance, the determined lateral distance, the first pre-defined threshold distance, the second pre-defined threshold distance, the pre-defined threshold speed, and/or the determined relative speed.

In accordance with an embodiment, a fourth alert may be generated that indicates the first vehicle cannot safely pass the detected second vehicle along the first predictive path within the first time period. The fourth alert may be generated when the determined lateral distance is below the first pre-defined threshold distance, the determined relative speed is above the pre-defined threshold speed, or the determined distance is below the second pre-defined threshold distance.

In accordance with an embodiment, a request signal may be communicated to a communication device associated with the second vehicle. The request signal may indicate an intention to overtake the second vehicle. An acknowledgement signal may be received from the communication device associated with the second vehicle in response to the communicated request signal. The request signal and the acknowledgement signal may be communicated via a wireless communication channel or a dedicated short-range communication (DSRC) channel.

FIG. 1 is a block diagram that illustrates a system configuration to provide driving assistance to safely overtake a vehicle, in accordance with an embodiment of the disclosure. With reference to FIG. 1, there is shown an exemplary system configuration 100. The system configuration 100 may include an image-capturing unit 102, an electronic control unit (ECU) 104, and one or more vehicles, such as a first vehicle 106 and a second vehicle 108. There is further shown a driver 114 of the first vehicle 106 and a first pre-defined threshold distance 116. In accordance with an embodiment, the system configuration 100 may further include a communication device 110 and a wireless communication network 112.

The image-capturing unit 102 may be installed at the front side of the first vehicle 106. The image-capturing unit 102 may be operable to capture a view, such as a plurality of images, in front of the first vehicle 106, and provide the captured data to the ECU 104 that may be used to detect the second vehicle 108.

The ECU 104 may be provided in the first vehicle 106. The ECU 104 may be associated with the driver 114 of the first vehicle 106. In accordance with an embodiment, the ECU 104 may be communicatively coupled to the communication device 110, associated with the second vehicle 108, via the wireless communication network 112.

The ECU 104 may comprise suitable logic, circuitry, interfaces, and/or code that may be configured to detect one or more vehicles, such as the second vehicle 108, in front of the first vehicle 106. The ECU 104 may be installed at the first vehicle 106. The ECU 104 may be configured to generate one or more alerts to assist the driver 114 to safely overtake one or more vehicles, such as the detected second vehicle 108. The ECU 104 may be configured to access sensor data from one or more vehicle sensors of a sensing system, and/or other vehicle data associated with the first vehicle 106. The sensor data may be accessed by the ECU 104, via an in-vehicle network, such as a vehicle area network (VAN) and/or in-vehicle data bus, such as a controller area network (CAN) bus. In accordance with an embodiment, the ECU 104 may be configured to communicate with external devices (such as the communication device 110), other communication devices, and/or a cloud server (not shown), via the wireless communication network 112.

The first vehicle 106 may comprise the ECU 104, which may be configured to detect oncoming traffic with respect to a direction of travel of the first vehicle 106. The first vehicle 106 may be a motorized vehicle. Examples of the first vehicle 106 may include, but are not limited to, a car, a hybrid vehicle, and/or a vehicle that uses one or more distinct renewable or non-renewable power sources. Examples of the renewable or non-renewable power sources may include fossil fuel, electric propulsion, hydrogen fuel, solar-power, and/or other forms of alternative energy.

The second vehicle 108 may be a non-motorized vehicle. The second vehicle 108 may be different from the first vehicle 106. In accordance with an embodiment, the communication device 110 may be associated with the second vehicle 108. Examples of second vehicle 108 may include, but are not limited to, a pedal cycle, such as a bicycle, an electric personal assistive mobility device (EPAMD), such as a Segway-like scooter, or a vehicle propelled by human power, and/or other non-motorized vehicle. Notwithstanding, the disclosure may not be so limited, and a pedestrian, a person riding a horse, a person driving an animal-drawn vehicle, may also be considered in place of the second vehicle 108, without deviating from the scope of the disclosure.

The communication device 110 may comprise suitable logic, circuitry, interfaces, and/or code that may be operable to communicate with the first vehicle 106. The communication device 110 may comprise one or more sensors, such as a geospatial position detection sensor, a movement detection sensor, and/or a speed sensor of the communication device 110. The communication device 110 may be configured to communicate sensor data associated with the second vehicle 108, to the first vehicle 106. Examples of communication device 110 may include, but are not limited to, a mobile device, a wearable device worn by a user of the second vehicle 108, such as a smart watch or a smart-glass, and/or a wireless communication device removably coupled to the second vehicle 108. In instances when the communication device 110 is coupled to the second vehicle 108, other sensor data, such as vehicle type, rate of change of speed and/or orientation of wheels, may be further communicated to the first vehicle 106, via the wireless communication network 112.

The wireless communication network 112 may include a medium through which the first vehicle 106 may communicate with the communication device 110 and/or one or more other motor vehicles, such as a third vehicle (not shown). Examples of the wireless communication network 112 may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a cloud network, a wireless fidelity (Wi-Fi) network, and/or a wireless local area network (WLAN). Various devices in the system configuration 100 may be operable to connect to the wireless communication network 112, in accordance with various wireless communication protocols. Examples of such wireless communication protocols may include, but are not limited to, IEEE 802.11, 802.11p, 802.15, 802.16, 1609, Wi-MAX, wireless access in vehicular environments (WAVE), cellular communication protocols, transmission control protocol and internet Protocol (TCP/IP), user datagram protocol (UDP), hypertext transfer protocol (HTTP), long-term evolution (LTE), file transfer protocol (FTP), ZigBee, enhanced data rates for GSM evolution (EDGE), infrared (IR), and/or Bluetooth (BT) communication protocols.

In operation, the ECU 104 may be configured to detect the second vehicle 108 in front of the first vehicle 106. The second vehicle 108 may be detected by use of the image-capturing unit 102. The ECU 104 may be configured to receive first sensor data related to the first vehicle 106. The received first sensor data may comprise at least a steering angle, a yaw rate, and/or a speed value of the first vehicle 106.

In instances when the communication device 110 is provided or associated with the detected second vehicle 108, the ECU 104 may be configured to communicate a request signal to the communication device 110, via the wireless communication network 112. The request signal may be communicated to indicate an intention to overtake the second vehicle 108. The ECU 104 may be configured to receive an acknowledgement signal from the communication device 110 associated with the second vehicle 108, in response to the communicated request signal. The request signal and the acknowledgement signal may be communicated via a wireless communication channel, such as the wireless communication network 112. In such an instance, the ECU 104 may be configured to receive the second sensor data from the communication device 110.

In instances when the communication device 110 is not provided, the ECU 104 may be configured to receive the second sensor data by use of one or more sensors, such as the image-capturing unit 102 and/or a radio wave-based object detection device. The one or more sensors may be installed at the first vehicle 106. The second sensor data may be related to the detected second vehicle 108. The second sensor data may be a relative displacement, a relative speed value, and/or a detected angle between the first vehicle 106 and the detected second vehicle 108.

In accordance with an embodiment, the ECU 104 may be configured to determine a first position associated with the first vehicle 106. The determination of the first position may occur along a first predictive path associated with the first vehicle 106. The ECU 104 may be configured to utilize the received first sensor data for the determination of the first predictive path.

In accordance with an embodiment, the ECU 104 may be configured to determine a second position associated with the detected second vehicle 108. The second position may correspond to the position of the detected second vehicle 108. In accordance with an embodiment, the determination of the second position may occur along a second predictive path associated with the detected second vehicle 108. The ECU 104 may be configured to utilize the received second sensor data for the determination of the second predictive path. Such determination of the first position and the second position may occur at a first time instance.

In accordance with an embodiment, the ECU 104 may be configured to determine whether a lateral distance between the determined first position and the determined second position is below the first pre-defined threshold distance 116. In accordance with an embodiment, the ECU 104 may be configured to determine whether a relative speed between the first vehicle 106 and the detected second vehicle 108 at the first time instance is above a pre-defined threshold speed.

The ECU 104 may be configured to generate a first alert when the determined lateral distance is below the first pre-defined threshold distance 116. In accordance with an embodiment, the ECU 104 may be configured to generate the first alert when the determined relative speed is above the pre-defined threshold speed.

In instances when the determined lateral distance is below the first pre-defined threshold distance and the determined relative speed is above the pre-defined threshold speed, the ECU 104 may be configured to generate the first alert. In such instances, the first alert may indicate that the first vehicle 106 cannot safely pass the detected second vehicle 108 along the first predictive path. The generated first alert may be visual information, haptic information, and/or audio information.

In accordance with an embodiment, the ECU 104 may be configured to generate a second alert. The second alert may indicate that the first vehicle 106 can safely pass the detected second vehicle 108 along the first predictive path. The second alert may be generated when the determined lateral distance is above the first pre-defined threshold distance 116 and the determined relative speed is below the pre-defined threshold speed.

In accordance with an embodiment, the ECU 104 may be configured to detect a third vehicle in an adjacent lane. The adjacent lane may correspond to oncoming traffic, with respect to a direction of movement of the first vehicle 106. The ECU 104 may be configured to determine a third position associated with the detected third vehicle. Such determination may occur at a second time instance along a third predictive path associated with the third vehicle in the adjacent lane. The second time instance may correspond to a time instance when the first vehicle is predicted to pass the third vehicle.

In accordance with an embodiment, the ECU 104 may be configured to determine whether a distance between the determined third position and the determined first position is above a second pre-defined threshold distance. The ECU 104 may be configured to generate a third alert. The third alert may indicate that the first vehicle 106 can safely pass the detected second vehicle 108 along the first predictive path within a first time period. The first time period may correspond to a certain time period available with the driver 114 of the first vehicle 106 to pass the detected second vehicle 108 along the first predictive path. Such time period may be displayed at a display screen of the first vehicle 106. The first time period may be determined based on the known lateral distance, the first pre-defined threshold distance 116, the determined relative speed, the pre-defined threshold speed, the determined distance, and/or the second pre-defined threshold distance. The third alert may be generated when the determined lateral distance is above the first pre-defined threshold distance 116, the determined relative speed is below the pre-defined threshold speed, and/or the determined distance is above the second pre-defined threshold distance.

In accordance with an embodiment, the ECU 104 may be configured to generate a fourth alert. The fourth alert may indicate that the first vehicle 106 cannot safely pass the detected second vehicle 108 along the first predictive path within the first time period. The fourth alert may be generated when the determined lateral distance is below the first pre-defined threshold distance 116, the determined relative speed is above the pre-defined threshold speed, and/or the determined distance is below the second pre-defined threshold distance.

In accordance with an embodiment, the ECU 104 may be configured to control the display of the generated alerts, such as the first alert, the second alert, the third alert, or the fourth alert, at the first vehicle 106. The generated alerts may indicate violation of a law, an ordinance, and/or a traffic regulation. The alerts may be controlled based on the type of display used, such as a head-up display (HUD) or a head-up display with an augmented reality system (AR-HUD), and/or according to type of traffic scenarios.

Figure 2:
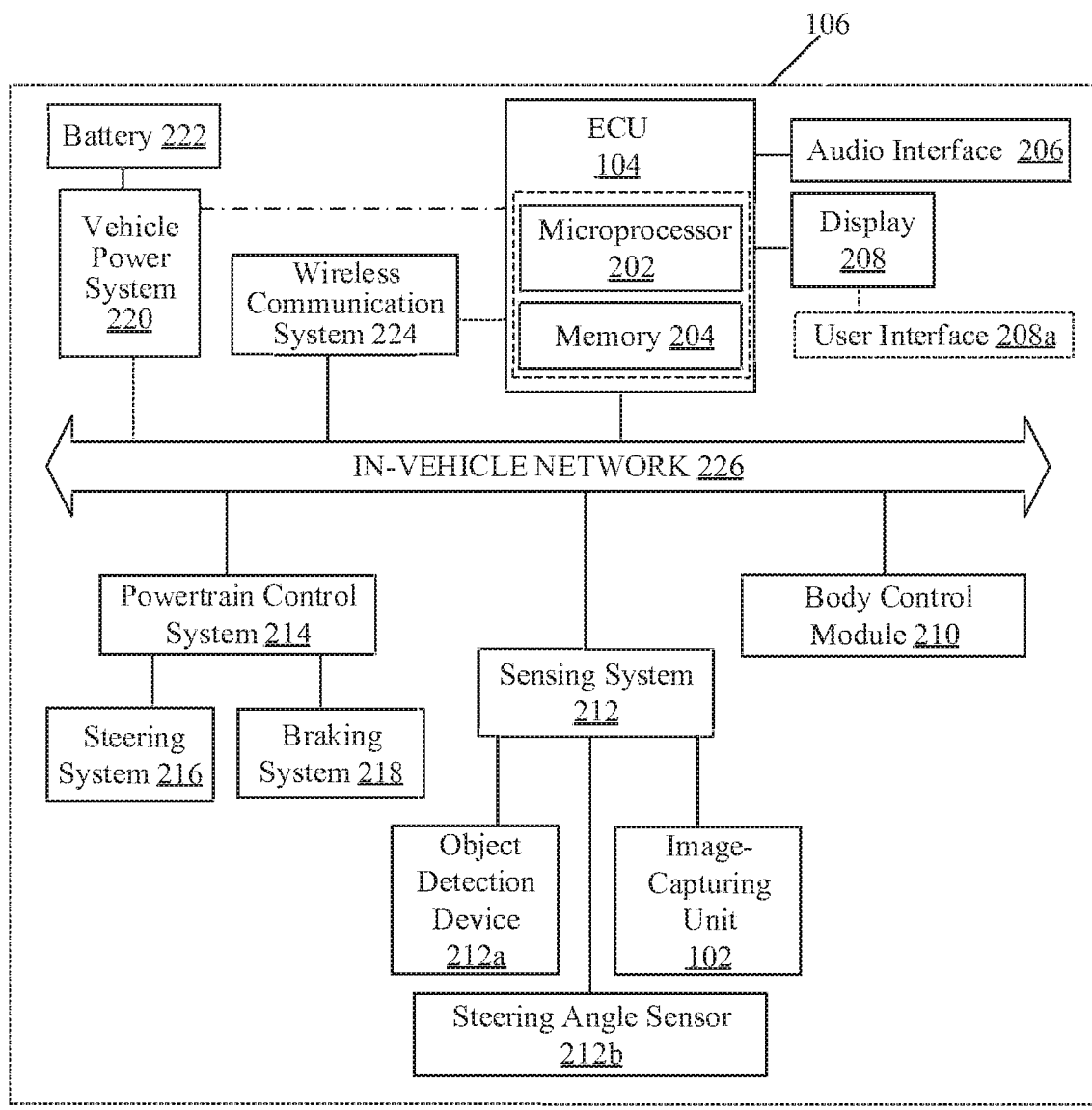
FIG. 2 is a block diagram that illustrates various exemplary components and systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1. With reference to FIG. 2, there is shown the first vehicle 106. The first vehicle 106 may comprise the ECU 104 that may include a microprocessor 202 and a memory 204. The first vehicle 106 may further comprise an audio interface 206 and a display 208 communicatively coupled to the ECU 104. The display 208 may be associated with one or more user interfaces, such as a user interface (UI) 208*a*. The first vehicle 106 may further comprise a body control module 210, a sensing system 212, and a powertrain control system 214. The sensing system 212 may include an object detection device 212*a*, a steering angle sensor 212*b* and the image-capturing unit 102 (FIG. 1). The powertrain control system 214 may include a steering system 216 and a braking system 218. The first vehicle 106 may further comprise a vehicle power system 220, a battery 222, a wireless communication system 224, and an in-vehicle network 226.

The various components or systems may be communicatively coupled via the in-vehicle network 226, such as a vehicle area network (VAN), and/or an in-vehicle data bus. The microprocessor 202 may be communicatively coupled to the sensing system 212, the wireless communication system 224, the audio interface 206, and the display 208. The microprocessor 202 may also be operatively connected with the body control module 210, the powertrain control system 214, the steering system 216, and the braking system 218. The wireless communication system 224 may be configured to communicate with one or more external devices, such as the communication device 110, via the wireless communication network 112 under the control of the microprocessor 202. A person ordinary skilled in the art will understand that the first vehicle 106 may also include other suitable components or systems, in addition to the components or systems which are illustrated herein to describe and explain the function and operation of the present disclosure.

The microprocessor 202 may comprise suitable logic, circuitry, interfaces, and/or code that may be configured to execute a set of instructions stored in the memory 204. The microprocessor 202 may be configured to determine a first position associated with the first vehicle 106 and a second position associated with the detected second vehicle 108. The microprocessor 202 may be configured to generate one or more alerts that may indicate whether it is safe or unsafe to pass the second vehicle 108. Examples of the microprocessor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a graphics processing unit (GPU), a state machine, and/or other processors or circuits.

The memory 204 may comprise suitable logic, circuitry, and/or interfaces that may be configured to store a machine code and/or a set of instructions with at least one code section executable by the microprocessor 202. The memory 204 may store one or more speech-generation algorithms, audio data that correspond to various alert sounds or buzzer sounds, and/or other data. Examples of implementation of the memory 204 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The audio interface 206 may be connected to a speaker, a chime, a buzzer, or other device that may be operable to generate a sound. The audio interface 206 may also be connected to a microphone or other device to receive a voice input from an occupant, such as the driver 114, of the first vehicle 106. The audio interface 206 may also be communicatively coupled to the microprocessor 202. The audio interface 206 may be a part of an in-vehicle infotainment (IVI) system or head unit of the first vehicle 106.

The display 208 may be configured to provide output to the driver 114. In accordance with an embodiment, the display 208 may be a touch screen display that may receive an input from the driver 114. Examples of the display 208 may include, but are not limited to, a heads-up display (HUD) or a head-up display with an augmented reality system (AR-HUD), a driver information console (DIC), a display screen of an infotainment unit or a head unit (HU), a see-through display, a projection-based display, a smart-glass display, and/or an electro-chromic display. The AR-HUD may be a combiner-based AR-HUD. The display 208 may be a transparent or a semi-transparent display screen. The display 208 may generate a two-dimensional (2D) or a three-dimensional (3D) graphical view of the generated alerts and/or the determined predictive paths, such as the first predictive path and the second predictive path. The graphical views may be generated under the control of the microprocessor 202.

The UI 208a may be rendered at the display 208, such as the HUD or the AR-HUD, under the control of the microprocessor 202. The display of the generated alerts, such as a predictive crash alert, the first alert, the second alert, the third alert, and the fourth alert, may be controlled at the first vehicle 106, via one or more user interfaces. Examples of the one or more user interfaces may be configured in accordance to the display 208, such as the UI 208a, as shown in FIGS. 3B, 3D, 3F, 3H, 4A, 4B, and 4C. The UI 208a may be configured for display on the AR-HUD. Similarly, another example of the UI 208a may be a UI 208b as shown in FIGS. 3C, 3E, 3G, and 3I. The UI 208b may be configured for display on the HUD.

The body control module 210 may refer to another electronic control unit that comprises suitable logic, circuitry, interfaces, and/or code that may be configured to control various electronic components or systems of the first vehicle 106. The body control module 210 may be configured to receive a command from the microprocessor 202. The body control module 210 may relay the command to other suitable vehicle systems or components for access control of the first vehicle 106.

The sensing system 212 may comprise the object detection device 212a, the steering angle sensor 212b, the image-capturing unit 102, and/or one or more other vehicle sensors provided in the first vehicle 106. The object detection device 212a may be a radio detection and ranging (RADAR) device or a laser-based object detection sensor, such as a light detection and ranging (LIDAR) device. The sensing system 212 may be operatively connected to the microprocessor 202 to provide input signals to the microprocessor 202. For example, the sensing system 212 may be used to sense or detect the first sensor data, such as a direction of travel, geospatial position, steering angle, yaw rate, speed, and/or rate of change of speed of the first vehicle 106. The first sensor data may be sensed or detected by use of one or more vehicle sensors of the sensing system 212, such as a yaw rate sensor, a vehicle speed sensor, odometric sensors, the steering angle sensor 212b, a vehicle travel direction detection sensor, a magnetometer, and a global positioning system (GPS). The sensor data associated with the detection of the second vehicle 108 may be referred to as the second sensor data. In accordance with an embodiment, the object detection device 212a and/or the image-capturing unit 102 may be used for detection and determination of the second sensor data under the control of the microprocessor 202. The second sensor data may be a relative displacement, a relative speed, and/or an angle detected between the first vehicle 106 and the detected second vehicle 108.

The powertrain control system 214 may refer to an onboard computer of the first vehicle 106 that controls operations of an engine and a transmission system of the first vehicle 106. The powertrain control system 214 may control ignition, fuel injection, emission systems, and/or operations of a transmission system (when provided) and the braking system 218.

The steering system 216 may be configured to receive one or more commands from the microprocessor 202. In accordance with an embodiment, the steering system 216 may automatically control the steering of the first vehicle 106. Examples of the steering system 216 may include, but are not limited to, a power assisted steering system, a vacuum/hydraulic based steering system, an electro-hydraulic power assisted system (EHPAS), and/or a "steer-by-wire" system, known in the art.

The braking system 218 may be used to stop or slow down the first vehicle 106 by application of frictional forces. The braking system 218 may be configured to receive a command from the powertrain control system 214 under the control of the microprocessor 202, when the first vehicle 106 is in an autonomous mode or a semi-autonomous mode. In accordance with an embodiment, the braking system 218 may be configured to receive a command from the body control module 210 and/or the microprocessor 202 when the microprocessor 202 preemptively detects a steep curvature, an obstacle, or other road hazards. The braking system 218 may be configured to receive one or more commands from the microprocessor 202 when the microprocessor 202 generates one or more alerts subsequent to detection of the second vehicle 108. The braking system 218 may be associated with a brake pedal and/or a gas pedal.

The vehicle power system 220 may regulate the charging and the power output of the battery to various electric circuits and the loads of the first vehicle 106, as described above. When the first vehicle 106 is a hybrid vehicle or an autonomous vehicle, the vehicle power system 220 may provide the required voltage for all of the components and enable the first vehicle 106 to utilize the battery 222 power for a sufficient amount of time. In accordance with an embodiment, the vehicle power system 220 may correspond to power electronics, and may include a microcontroller that may be communicatively coupled (shown by dotted lines) to the in-vehicle network 226. In such an embodiment, the microcontroller may receive command from the powertrain control system 214 under the control of the microprocessor 202.

The battery 222 may be source of electric power for one or more electric circuits or loads (not shown). For example, the loads may include, but are not limited to various lights, such as headlights and interior cabin lights, electrically powered adjustable components, such as vehicle seats, mirrors, windows or the like, and/or other in-vehicle infotainment system, such as radio, speakers, electronic navigation system, electrically controlled, powered and/or assisted steering, such as the steering system 216. The battery 222 may be a rechargeable battery. The battery 222 may be a source of electrical power to the ECU 104 (shown by dashed lines), the one or more sensors of the sensing system 212, and/or one or hardware units, such as the display 208, of the in-vehicle infotainment system. The battery 222 may be a source of electrical power to start an engine of the first vehicle 106 by selectively providing electric power to an ignition system (not shown) of the first vehicle 106.

The wireless communication system 224 may comprise suitable logic, circuitry, interfaces, and/or code that may be configured to communicate with one or more external devices, such as the communication device 110, and one or more cloud servers, via the wireless communication network 112. The wireless communication system 224 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The wireless communication system 224 may wirelessly communicate by use of the wireless communication network 112 (as described in FIG. 1).

The in-vehicle network 226 may include a medium through which the various control units, components, and/or systems of the first vehicle 106, such as the ECU 104, body control module 210, the sensing system 212, the powertrain control system 214, the wireless communication system 224, the audio interface 206, and the display 208, may communicate with each other. In accordance with an embodiment, in-vehicle communication of audio/video data for multimedia components may occur by use of Media Oriented Systems Transport (MOST) multimedia network protocol of the in-vehicle network 226. The MOST-based network may be a separate network from the controller area network (CAN). The MOST-based network may use a plastic optical fiber (POF). In accordance with an embodiment, the MOST-based network, the CAN, and other in-vehicle networks may co-exist in a vehicle, such as the first vehicle 106. The in-vehicle network 226 may facilitate access control and/or communication between the microprocessor 202 (and the ECU 104) and other ECUs, such as a telematics control unit (TCU) of the first vehicle 106. Various devices or components in the first vehicle 106 may be configured to connect to the in-vehicle network 226, in accordance with various wired and wireless communication protocols. Examples of the wired and wireless communication protocols for the in-vehicle network 226 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I²C), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

In operation, the microprocessor 202 may be configured to detect the second vehicle 108 which may be in front of the first vehicle 106. The microprocessor 202 may be configured to utilize the object detection device 212a and/or the image-capturing unit 102 for the detection of the second vehicle 108. The microprocessor 202 may be configured to receive sensor data, such as the first sensor data and the second sensor data, from the sensing system 212.

In accordance with an embodiment, the first sensor data may correspond to the first vehicle 106. The first sensor data may comprise a steering angle, a yaw rate, speed of the first vehicle 106, and/or the like. The first sensor data may be received from the one or more sensors of the sensing system 212 of the first vehicle 106, via the in-vehicle network 226. For example, the microprocessor 202 may extract the first sensor data from the CAN bus.

In accordance with an embodiment, the second sensor data may correspond to the detected second vehicle 108. For example, the second sensor data may be received from the image-capturing unit 102 installed at the first vehicle 106. The image-capturing unit 102 may provide a field-of-view (FOV) in front of the first vehicle 106. The FOV may correspond to a video or a plurality of images, which may be stored in the memory of the ECU 104. In accordance with an embodiment, such storage may be a temporary storage that processes an image buffer for the detection of the second vehicle 108. In accordance with an embodiment, both the RADAR and the image-capturing unit 102 may be utilized to detect and/or determine the second sensor data associated with the second vehicle 108. The second sensor data may comprise values that correspond to the relative displacement, the relative speed, and/or the angle detected between the first vehicle 106 and the detected second vehicle 108. In accordance with an embodiment, when the communication device 110 is associated with the second vehicle 108, the second sensor data may be received directly from the communication device 110. For example, the communication device 110, such as a smart watch or a smart-glass, may be worn by the rider of the second vehicle 108, such as a bicycle. Thus, the position and the movement information of the communication device 110 may be representative of the position and speed of the bicycle. Such information that corresponds to the second sensor data may be communicated to the wireless communication system 224, via the wireless communication network 112.

In accordance with an embodiment, the microprocessor 202 may be configured to determine the first predictive path based on the received first sensor data. In accordance with an embodiment, the first predictive path may be continuously updated based on changed values of the received first sensor data. The microprocessor 202 may be configured to determine a first position associated with the first vehicle 106. The determination of the first position may occur along the first predictive path associated with the first vehicle 106.

In accordance with an embodiment, the microprocessor 202 may be configured to determine a second position associated with the detected second vehicle 108. In accordance with an embodiment, as the second vehicle 108 is continuously detected until overtake occurs, the second position associated with the second vehicle 108 and/or the first vehicle 106 may be continuously updated at various time instances, such as every 10 milliseconds (ms). The second position may correspond to the position of the second vehicle 108 at various time instances, such as a first time instance. In accordance with an embodiment, the determination of the second position may occur along a second predictive path associated with the detected second vehicle 108. The microprocessor 202 may be configured to utilize the received second sensor data for the determination of the second predictive path. The determination of the first position and the second position may occur at the first time instance. The first time instance may correspond to time when the first vehicle 106 is predicted to pass the detected second vehicle 108.

In accordance with an embodiment, the microprocessor 202 may be configured to determine whether a lateral distance between the determined first position and the determined second position is below the first pre-defined threshold distance 116. The first pre-defined threshold distance 116 may correspond to a pre-specified safe distance. The first pre-defined threshold distance 116 may be preset by a user, such as the driver 114. Thus, the ECU 104 may be effectively utilized in different jurisdictions with different requirements of safe speed and safe distance to avoid traffic violation.

In accordance with an embodiment, the microprocessor 202 may be configured to utilize one or more pre-defined constants, for the determination of the lateral distance between the determined first position and the determined second position. The utilization of the one or more pre-defined constants may be based on one or more criteria. The one or more criteria may include a position of installation of the sensors, such as the RADAR and/or the image-capturing unit 102, vehicle type, and/or size of the vehicle body of first vehicle 106 and/or the vehicle body (not shown) of the second vehicle 108. The utilization of the one or more pre-defined constants may ensure that the determined lateral distance is a precise calculation between side edges of two vehicles, such as the first vehicle 106 and the second vehicle 108 (shown in FIG. 3A). For example, a first length constant associated with the first vehicle 106 may be "2 feet" when the RADAR is installed "2 feet" away from a first side edge of the vehicle body of the first vehicle 106. A second length constant associated with the second vehicle 108 may be "0.3 feet" when the second vehicle 108 is detected to be a bicycle. Accordingly, at the time of determination of the lateral distance between the determined first position and the determined second position, the first length constant and the second length constant may be utilized. Thus, the lateral distance may be determined as "3.7 feet", which may be the effective lateral distance after the deduction of values of the first length constant and the second length constant. The determined lateral distance may correspond to the lateral distance between a first side edge of the first vehicle 106 and a second side edge of the second vehicle 108. The first side edge and the second side edge may correspond to the edges that face each other at the time of overtake. The association between the vehicle types and the one or more pre-defined constants may be stored at the ECU 104. A different constant may be utilized for a different type of vehicle, such as a pre-defined length constant, "0.3 feet", which may be used to ascertain an outer edge of the bicycle. Similarly, another pre-defined length constant, "0.5 feet", may be used to ascertain an outer edge of the EPAMD. In an instance when a plurality of bicycles are detected as moving together, the lateral distance may be determined with respect to the bicycle that may be the nearest to the first vehicle 106 at the time of overtake.

In accordance with an embodiment, the microprocessor 202 may be configured to dynamically update the first pre-defined threshold distance 116 based on geo-location of the first vehicle 106. For example, the user may preset the first pre-defined threshold distance 116 to "3 feet". In an example, the first vehicle 106 may often need to cross interstate borders, such as from New York to Pennsylvania. The traffic regulations in Pennsylvania may require a vehicle to maintain a safe distance of "4 feet" (instead of "3 feet") between the first vehicle 106 and the second vehicle 108 during overtake. It may be difficult for the user to remember different requirements in different jurisdictions. In another example, the microprocessor 202 may be configured to dynamically reset or update the first pre-defined threshold distance 116 to "4 feet" from the previously set "3 feet". Such auto-update may occur when the geo-location of the first vehicle 106 is detected to be in Pennsylvania.

In accordance with an embodiment, the microprocessor 202 may be configured to determine whether a relative speed between the first vehicle 106 and the detected second vehicle 108 at the first time instance is above a pre-defined threshold speed. In accordance with an embodiment, the microprocessor 202 may be configured to dynamically update the first pre-defined threshold distance 116, based on the determined relative speed, in addition to the geo-location of the first vehicle 106. For example, in certain jurisdictions, such as New Hampshire, the requirement to maintain the specified safe distance, such as "3 feet", during overtakes varies based on the speed of the overtaking vehicle, such as the first vehicle 106. One additional foot of clearance (above "3 feet") may be required for every 10 miles per hour (MPH) above 30 MPH. The microprocessor 202 may be configured to dynamically update the first pre-defined threshold distance 116 to "5 feet" from the previously set three feet. Such an update may occur when it is difficult to decelerate the first vehicle 106, and the determined speed is 50 MPH for the detected geo-location, such as New Hampshire.

The microprocessor 202 may be configured to generate a first alert when the determined lateral distance is below the first pre-defined threshold distance 116. In accordance with an embodiment, the microprocessor 202 may be configured to generate the first alert when the determined relative speed, such as 60 MPH, is above the pre-defined threshold speed, such as 30 MPH. In instances when the determined lateral distance is below the first pre-defined threshold distance 116 or the determined relative speed is above the pre-defined threshold speed, the microprocessor 202 may be configured to generate the first alert that may indicate the first vehicle 106 cannot safely pass the detected second vehicle 108 along the first predictive path. The generated first alert may comprise visual information displayed on the display 208 by use of the UI 208a. The generated first alert may be outputted as a haptic response, such as a vibration of the steering wheel, and/or as audio output by use of the audio interface 206.

The microprocessor 202 may be configured to generate a crash alert when the determined lateral distance is below another pre-defined threshold distance. The other pre-defined threshold distance may be pre-configured to determine a possible crash between the first vehicle 106 and the second vehicle 108. The other pre-defined threshold distance may be even below than the first pre-defined threshold distance 116.

In accordance with an embodiment, the microprocessor 202 may be configured to generate a second alert. The second alert may indicate that the first vehicle 106 can safely pass the detected second vehicle 108 along the first predictive path. Such indication of the second alert may occur when the determined lateral distance is above the first pre-defined threshold distance 116 and the determined relative speed is below the pre-defined threshold speed.

In accordance with an embodiment, the microprocessor 202 may be configured to detect a third vehicle in an adjacent lane. The adjacent lane may correspond to oncoming traffic with respect to a direction of movement of the first vehicle 106. The microprocessor 202 may be configured to determine a third position associated with the detected third vehicle. Such determination may occur at the first time instance along a third predictive path associated with the third vehicle in the adjacent lane.

In accordance with an embodiment, the microprocessor 202 may be configured to determine whether the distance between the determined third position and the determined first position is above a second pre-defined threshold distance. In such a case, the microprocessor 202 may be configured to generate a third alert. The third alert may indicate that the first vehicle 106 can safely pass the detected second vehicle 108 along the first predictive path within a first time period. The third alert may be generated when a plurality of conditions is detected to ensure a safe overtake. The plurality of conditions include a condition when the determined lateral distance is above the first pre-defined threshold distance 116, the determined relative speed is below the pre-defined threshold speed, and/or the determined distance is above the second pre-defined threshold distance. The first time period may be determined based on the determined lateral distance, the first pre-defined threshold distance 116, the determined relative speed, the pre-defined threshold speed, the determined distance, and/or the second pre-defined threshold distance.

In accordance with an embodiment, the microprocessor 202 may be configured to generate a fourth alert. The fourth alert may indicate that the first vehicle 106 cannot safely pass the detected second vehicle 108 along the first predictive path within the first time period. The fourth alert may be generated when the determined lateral distance is below the first pre-defined threshold distance 116, the determined relative speed is above the pre-defined threshold speed, and/or the determined distance is below the second pre-defined threshold distance.

In accordance with an embodiment, the microprocessor 202 may be configured to control the display of generated alerts, such as the first alert, the second alert, the third alert, or the fourth alert, in the first vehicle 106. The control of display of the generated alerts may occur via the UI 208a are rendered on the display 208, such as the AR-HUD. The generated alerts, such as the first alert, may indicate violation of a law, an ordinance, and/or a traffic regulation.

In accordance with an embodiment, the microprocessor 202 may be configured to generate different audio data based on the generated alert types. The output of audio data may occur together with the display of the generated alerts by use of the audio interface 206. For example, when it is detected that the first vehicle 106 can safely pass the detected second vehicle 108, the output of generated audio data may occur, such as "No traffic rule violation detected, you can safely overtake the bicycle" or "Please maintain the current speed and steering angle; lateral distance of "5 feet" and speed of "15 MPH" estimated at the time of overtake". Further, when it is detected that the first vehicle 106 cannot safely pass the detected second vehicle 108, the microprocessor 202 may generate one or more visual and/or audio recommendations, such as "Current speed is unsafe to overtake", "Time to pass the bicycle is estimated to be 5 seconds; please decelerate slowly from current speed of 70 MPH to 20 MPH", and "Safe lateral distance detected".

In accordance with an embodiment, the microprocessor 202 may be configured to determine a marginal path associated with the second vehicle 108. The marginal path may correspond to the first pre-defined threshold distance 116. The microprocessor 202 may be configured to control display of the marginal path. The marginal path may run parallel to the direction of movement of the second vehicle 108, and/or the second predictive path. The marginal path may aid in easy recognition of the specified safe distance requirement when displayed on the AR-HUD (shown in FIGS. 3A and 3B).

In accordance with an embodiment, the microprocessor 202 may be configured to reproduce buzzer and/or chime sounds when it is detected that the first vehicle 106 cannot safely pass the detected second vehicle 108, along the first predictive path. Such reproduction of buzzer and/or chime sounds stored in the memory may occur together with the display of the generated alerts. The microprocessor 202 may be configured to control the pitch of the buzzer and/or the chime sound to indicate danger according to the generated alerts type. For example, a low-pitch buzzer sound may be generated when time or distance to pass the second vehicle 108 is above the pre-determined threshold. A high-pitch or continuous chime may be outputted when time or distance to pass the second vehicle 108 is below the pre-determined threshold, such as only a minute left to overtake. In accordance with an embodiment, the microprocessor 202 may be configured to automatically control one or more components or systems, such as the powertrain control system 214, the steering system 216, the braking system 218, the sensing system 212, and/or the body control module 210 of the first vehicle 106, when the first vehicle 106 is in an autonomous operating mode. Such auto control may be based on the generated one or more alerts, such as the crash alert, the first alert, the second alert, the third alert, or the fourth alert, to safely overtake the second vehicle 108.

Figure 3A:
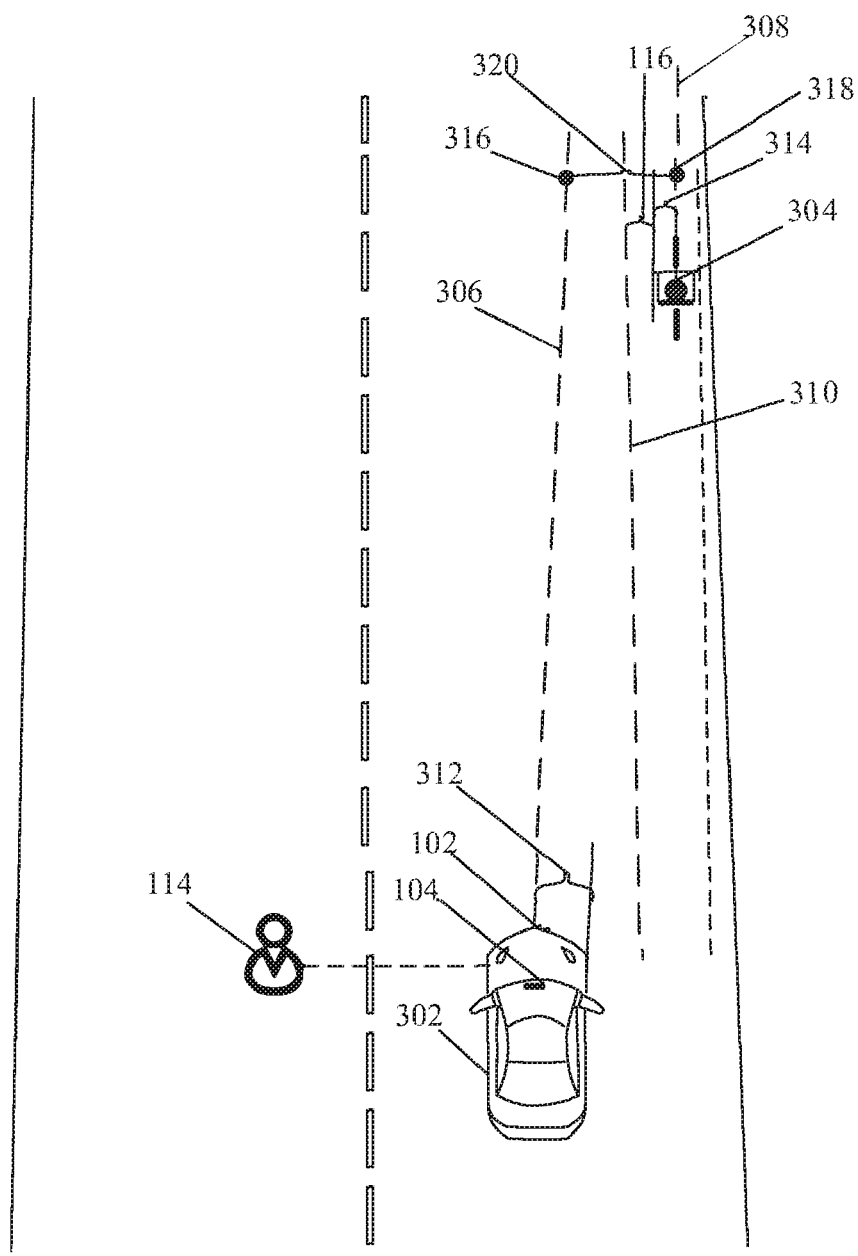
FIGS. 3A, 3B, 3C, 3D, 3E, 3F, 3G, 3H and 3I illustrate a first exemplary scenario for implementation of the disclosed system and method to provide driving assistance to safely overtake a vehicle, in accordance with an embodiment of the disclosure.

FIGS. 3A, 3B, 3C, 3D, 3E, 3F, 3G, 3H and 3I illustrate a first exemplary scenario for implementation of the disclosed system and method to provide driving assistance to safely overtake a vehicle, in accordance with an embodiment of the disclosure. FIGS. 3A, 3B, 3C, 3D, 3E, 3F, 3G, 3H and 3I are explained in conjunction with elements from FIG. 1 and FIG. 2. With reference to FIG. 3A, there is shown a car 302, a bicycle 304 with its rider, a first predictive path 306, a second predictive path 308, a marginal path 310, a first length constant 312, a second length constant 314, a first position 316, a second position 318, a lateral distance 320, the first pre-defined threshold distance 116, and the ECU 104. The car 302 may include the object detection device 212a, such as the RADAR device, and the image-capturing unit 102 (as shown in FIG. 2).

In accordance with the first exemplary scenario, the car 302 and the bicycle 304 may travel in the same direction along the same lane of a road. The driver 114 of the car 302 may intend to overtake the bicycle 304. The car 302 may correspond to the first vehicle 106 (FIG. 1). The bicycle 304 and rider may correspond to the second vehicle 108 (FIG. 1).

The first predictive path 306 may correspond to the determined first predictive path based on the received first sensor data (as described in FIGS. 1 and 2). The second predictive path 308 may correspond to the determined second predictive path based on the received second sensor data (as described in FIGS. 1 and 2). In accordance with the first exemplary scenario, the second sensor data may be input signals received from the object detection device 212a installed at the car 302.

The marginal path 310 may refer to a line at a safe distance, such as the first pre-defined threshold distance 116, from an outer edge of the bicycle 304. The marginal path 310 may correspond to the determined marginal path (FIG. 2). The first length constant 312 and the second length constant 314 may correspond to the one or more pre-defined constants, as described in FIG. 2.

In operation, the ECU 104 may be configured to detect the bicycle 304 in front of the car 302, by use of the image-capturing unit 102. The ECU 104 may be configured to determine the first position 316 associated with the car 302, along the determined first predictive path 306. The ECU 104 may be configured to determine the second position 318 associated with detected bicycle 304, by use of the object detection device 212a. The first position 316 and the second position 318 may be determined for a first time instance, such as a time when the car 302 is predicted to overtake the detected bicycle 304.

The ECU 104 may be configured to determine whether the lateral distance 320 between the determined first position 316 and the determined second position 318 is below the first pre-defined threshold distance 116. The ECU 104 may be configured to utilize one or more constants, such as the first length constant 312 and the second length constant 314, to accurately determine the lateral distance 320.

Figure 3B:
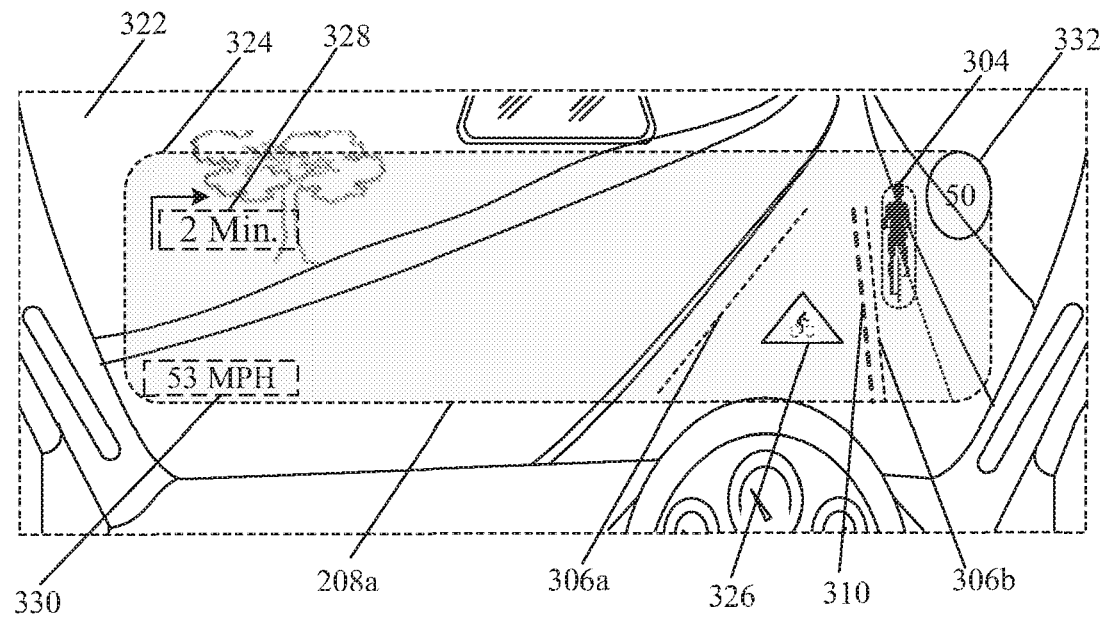
Figure 3C:
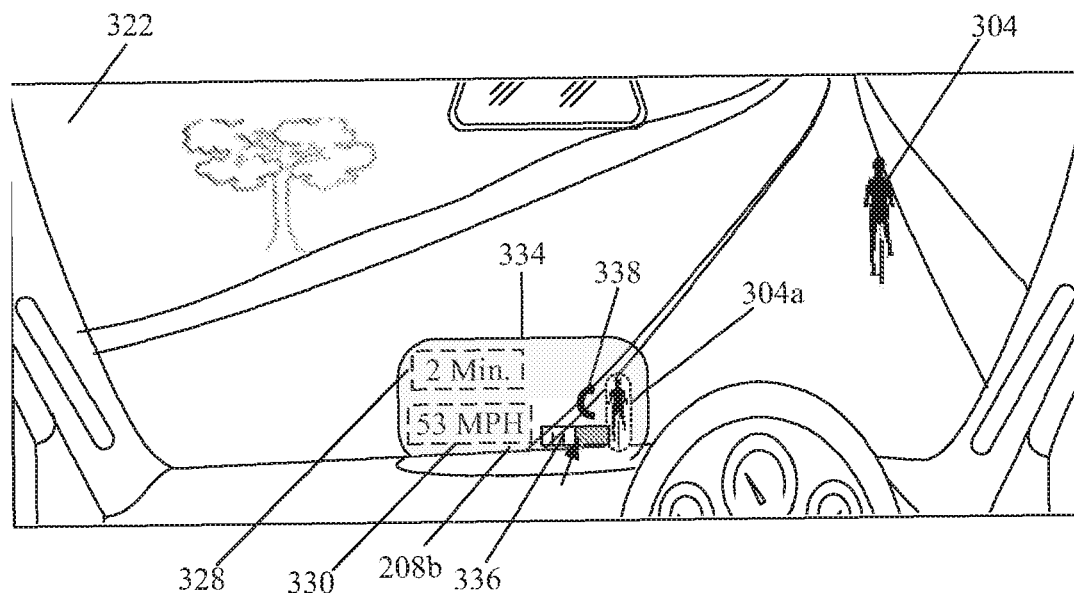

In accordance with an embodiment, in addition to the first predictive path 306 and/or the second predictive path 308, the ECU 104 may also determine the marginal path 310. The ECU 104 may generate a first alert when the determined lateral distance 320 is below the first pre-defined threshold distance 116 for the first time instance, as shown in FIG. 3B and FIG. 3C. FIG. 3B depicts the sequence of operations for the first exemplary scenario of FIG. 3A.

FIG. 3B shows a cut section of an interior portion of the car 302 to depict generation of the first alert. FIG. 3B is explained in conjunction with elements from FIGS. 1, 2, and 3A. With reference to FIG. 3B, there is further shown a windshield 322, an AR-HUD 324, a first graphical icon 326, a first time period 328, a relative speed value 330, and a speed limit 332 for the road. There is further shown the first predictive path 306, the marginal path 310, and the bicycle 304 (of FIG. 3A). The AR-HUD 324 may correspond to the display 208 (FIG. 2). The first predictive path 306 may be displayed as two lines 306a and 306b on AR-HUD 324 that represents outer boundaries of the car 302 (hereinafter referred to as first boundary line 306a and second boundary line 306b). The display at the AR-HUD 324 may occur via the UI 208a that may be one of the UI 208a (FIG. 2).

A view of the outside, such as the road with the detected bicycle 304, may be visible through the AR-HUD 324 from the interior of the car 302. The AR-HUD 324 may be integrated on the windshield 322 for a hands-free and unobtrusive display for the driver 114 and other occupant(s) of the car 302. The second boundary line 306b of the car 302 may be closer to the detected bicycle 304 than the marginal path 310 at the first time instance. The first time instance may correspond to a time instance when the car 302 is predicted to pass the detected bicycle 304. The ECU 104 may be configured to control the display of the generated first alert on the AR-HUD 324 of the car 302. The first graphical icon 326 represents the first alert that indicates the car 302 does not have enough marginal distance to pass the detected bicycle 304 safely or the car 302 violates a regulation to pass the detected bicycle 304. The driver 114 of the car 302 can easily and intuitively find a necessity to change a driving path of the car 302 away from the detected bicycle 304 by use of the second boundary line 306b, the marginal path 310, and the first graphical icon 326.

In an example, the color of the first boundary line 306a, the second boundary line 306b, the marginal path 310, and a boundary of the detected bicycle 304, may turn to red from green to indicate the generated first alert. The boundary around the detected bicycle 304 and its rider is shown as dotted lines. Display of the first graphical icon 326 may indicate that the car 302 cannot safely overtake the detected bicycle 304 along the first predictive path 306 (shown as the two dashed lines, the first boundary line 306a and the second boundary line 306b).

In accordance with an embodiment, a certain time period, such as the first time period 328, available with the driver 114 of the car 302 to pass the detected bicycle 304 along the first predictive path 306, may also be displayed on the AR-HUD 324. The time period may be displayed in consideration of a type of lane and an existence of oncoming vehicle. For example, if the lane on which the bicycle 304 is detected, allows overtaking and an oncoming vehicle does not pass the car 302 for a predetermined time, a remaining time, such as the first time period 328, to pass the detected bicycle 304 and an arrow are displayed (as shown). Similarly, a relative speed value, such as the relative speed value 330, determined based on received first sensor data and second sensor data, may also be displayed on the AR-HUD 324. The relative speed value 330 may represent that the determined relative speed, such as "53 MPH" is above the pre-defined threshold speed, such as "30 MPH". The speed limit 332 may be the detected speed limit value, such as "50 MPH", for the road on which the car 302 is driven. Such operations and indications may further provide enhanced visualization and preemptive driving assistance at the car 302 to safely pass the detected bicycle 304 and without a violation of traffic rules.

FIG. 3C shows the generated first alert in a HUD 334 instead of the AR-HUD 324 (of FIG. 3B), in accordance with an embodiment. The HUD 334 may be a semi-transparent display. FIG. 3C is explained in conjunction with elements from FIGS. 1, 2, and 3A. With reference to FIG. 3C, there is further shown a graphical bar 336, a first overtake symbol 338, and a graphical representation 304a of the detected bicycle 304 and rider on the HUD 334. The display at the HUD 334 may occur via the UI 208b that may be one of the UI 208a (FIG. 2).

The graphical bar 336 indicates the determined lateral distance 320 between the car 302 and the detected bicycle 304. In instances when the determined lateral distance 320 is below another pre-defined threshold, at least a portion of the graphical bar 336 may turn into red color to indicate a possible crash. In instances when the determined lateral distance 320 is below the first pre-defined threshold distance 116 and above the other pre-defined threshold, a color of the graphical bar 336 may turn into yellow. On the other hand, when the determined distance is above the first pre-defined threshold distance 116, a color of bar may turn into green. The color of "red" may indicate a possibility of a crash, "yellow" may indicate unsafe pass or violation of regulation, and the color "green" may indicate a safe pass between the car 302 and the detected bicycle 304.

The first overtake symbol 338 indicates if overtaking the detected bicycle 304 is safe or unsafe based on an existence of oncoming vehicle. The first overtake symbol 338 may be displayed in red to indicate an unsafe overtake and in green to indicate a safe overtake. The graphical representation 304a may refer to a representation of the detected bicycle 304 and its rider on the HUD 334.

The ECU 104 may be configured to control display of the generated first alert on the HUD 334. The first overtake symbol 338, a color change of the graphical bar 336 may indicate the generated first alert on the HUD 334. For example, the first overtake symbol 338 may be displayed in red to indicate an unsafe pass (FIG. 3C). The driver 114 of the car 302 may maneuver the car 302 away from the bicycle 304 based on the generated first alert.

Figure 3D:
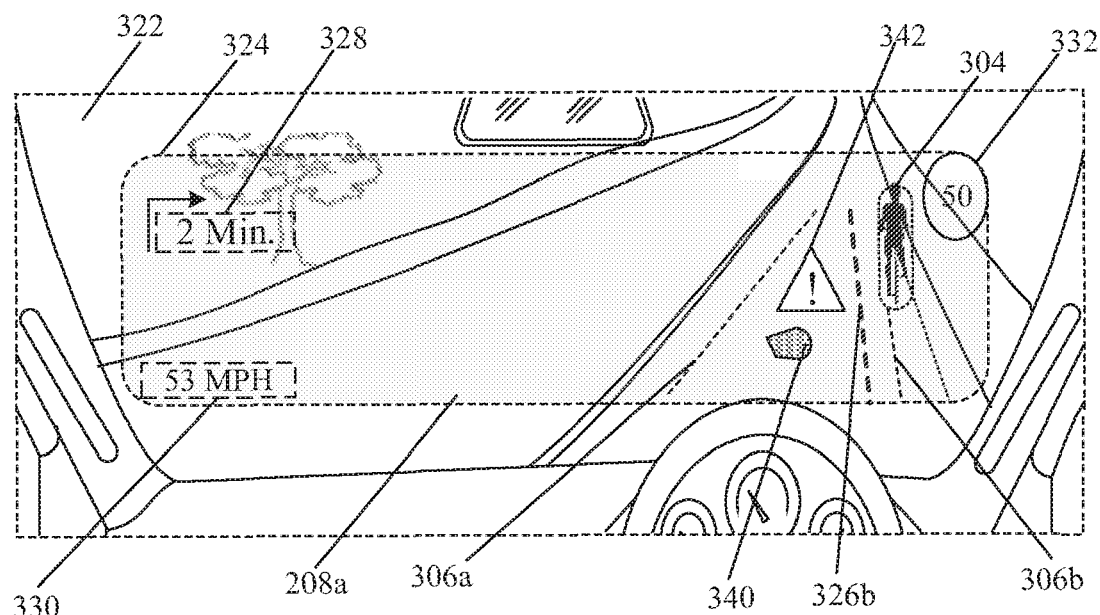

With reference to FIG. 3D, there is shown an obstacle 340 and a crash alert icon 342, in addition to the first boundary line 306a and the second boundary line 306b of the car 302, the marginal path 310, the windshield 322, the AR-HUD 324, the first graphical icon 326, the first time period 328, the relative speed value 330, the speed limit 332 for the road, and the detected bicycle 304, as described FIG. 3B. In certain instances, the driver 114 may maneuver the car 302 towards the bicycle 304. For example, when the obstacle 340 is detected on the road, the driver 114 of the car 302 may accordingly maneuver the car 302 to avoid the obstacle 340.

The crash alert icon 342 represents a crash alert for a possible crash between the car 302 and the detected bicycle 304 along the first predictive path 306 at the time of overtake. The first predictive path 306 may be displayed as the first boundary line 306a and the second boundary line 306b as a predictive driving path of the car 302. Such crash alert may be generated when the determined lateral distance 320 is below the other pre-defined threshold distance. The other pre-defined threshold distance may be pre-configured to determine a possible crash between the car 302 and the bicycle 304. The other pre-defined threshold distance may be even below the first pre-defined threshold distance 116. The driver 114 of the car 302 can easily and intuitively find a necessity to change a driving path of the car 302 away from the detected bicycle 304 by use of the second boundary line 306b that indicates a possible crash (as shown in FIG. 3D), the marginal path 310, and the crash alert icon 342. One or more recommendations may also be generated to advise the driver 114 to reduce the speed of the car 302 to avoid both the obstacle 340 and the possibility of the crash.

Figure 3E:
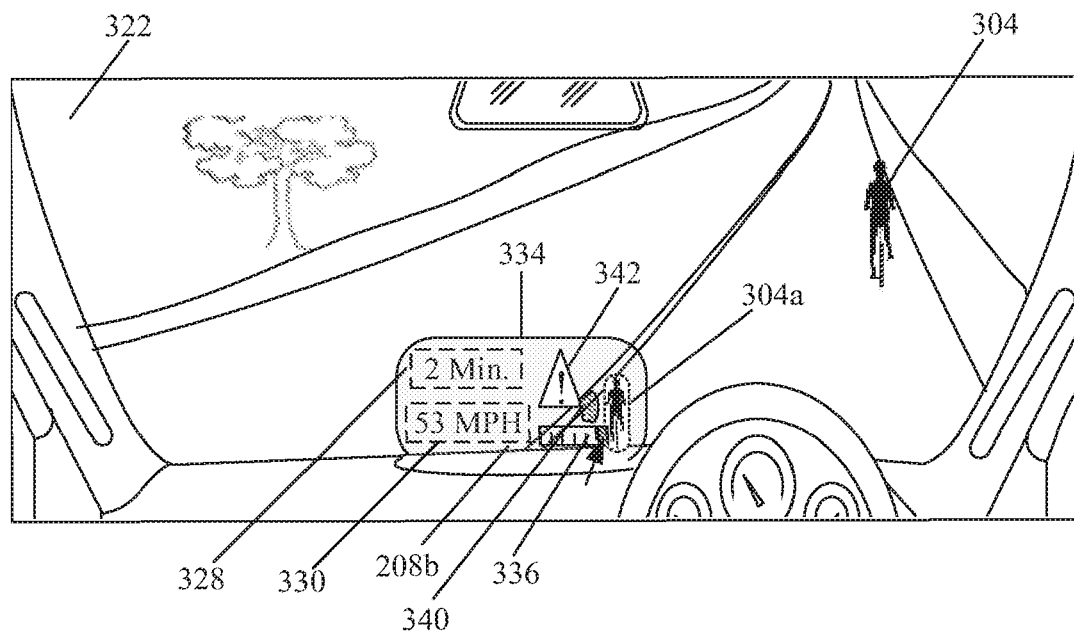

FIG. 3E shows the generated crash alert in the HUD 334 instead of the AR-HUD 324 (as shown in FIG. 3D), in accordance with an embodiment. FIG. 3C is explained in conjunction with elements from FIGS. 1, 2, 3A, 3B, 3C, and 3D. With reference to FIG. 3E, a portion of the graphical bar 336 may turn into red color to indicate a possible crash. The determined lateral distance 320 between the car 302 and the detected bicycle 304 that is below the other pre-defined threshold distance is displayed in a distance scale of the graphical bar 336 (In FIG. 3E, the determined lateral distance 320 is shown as a dark shaded portion in the graphical bar 336 and indicated by an arrow mark). A reduction in length of the dark shaded portion (shown by an arrow mark) in the distance scale of the graphical bar 336 from previous length of the dark shaded portion in the distance scale may also indicate a potential danger of a crash (the crash alert).

Figure 3F:
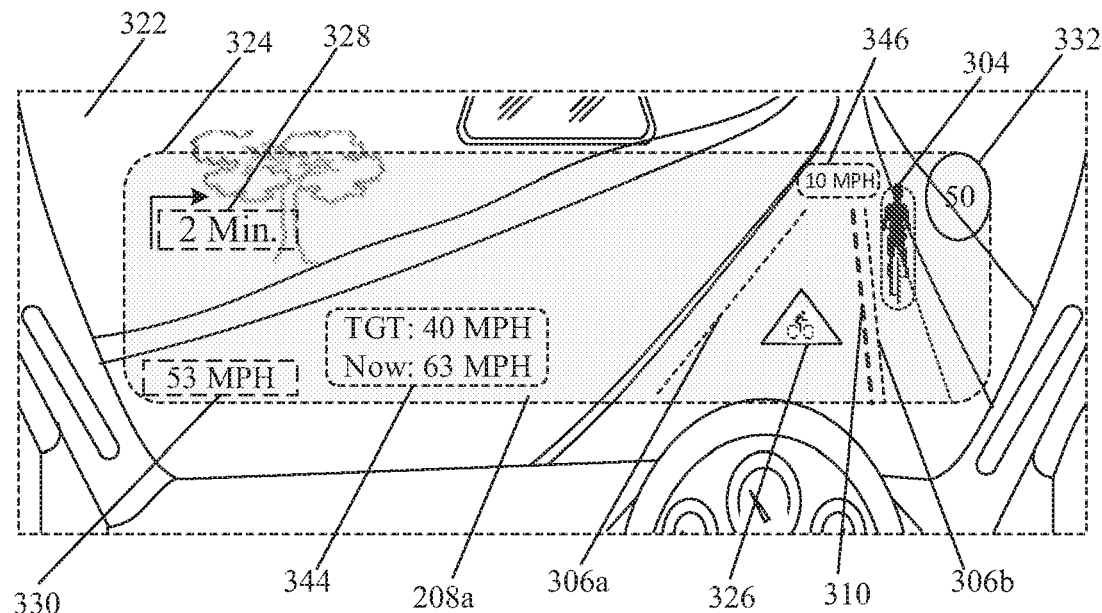

FIG. 3F depicts generation of the first alert in an alternative manner as shown in FIG. 3B. FIG. 3F is explained in conjunction with elements from FIGS. 1, 2, 3A and 3B. With reference to FIG. 3F, there is further shown a first speed information 344 related to the car 302 and a second speed information 346 related to the detected bicycle 304 at the AR-HUD 324, in addition to the elements shown in FIG. 3B. The first speed information 344 depicts the current speed of the car 302 and a calculated target speed of the car 302. The second speed information 346 depicts current speed of the bicycle 304.

In instances when the determined relative speed, such as "53 MPH", is above the pre-defined threshold speed, such as "30 MPH". Current speed of the car 302 and a target speed to make the relative speed lower than the pre-defined threshold speed may be displayed as a speed alert. The speed alert may be displayed together with the first graphical icon 326 that may collectively represent the first alert. In this case, current speed of the car 302 may be "63 MPH", speed of the bicycle 304 may be "10 MPH" and the relative speed may be "53 MPH" (shown as the relative speed value 330). As the pre-defined threshold speed (the threshold relative speed) is preset as "30 MPH", the target speed is calculated as "40 MPH". The displayed target speed may help the driver 114 to maintain a safe speed preemptively to avoid a violation of traffic regulation at the time of overtake.

Figure 3G:
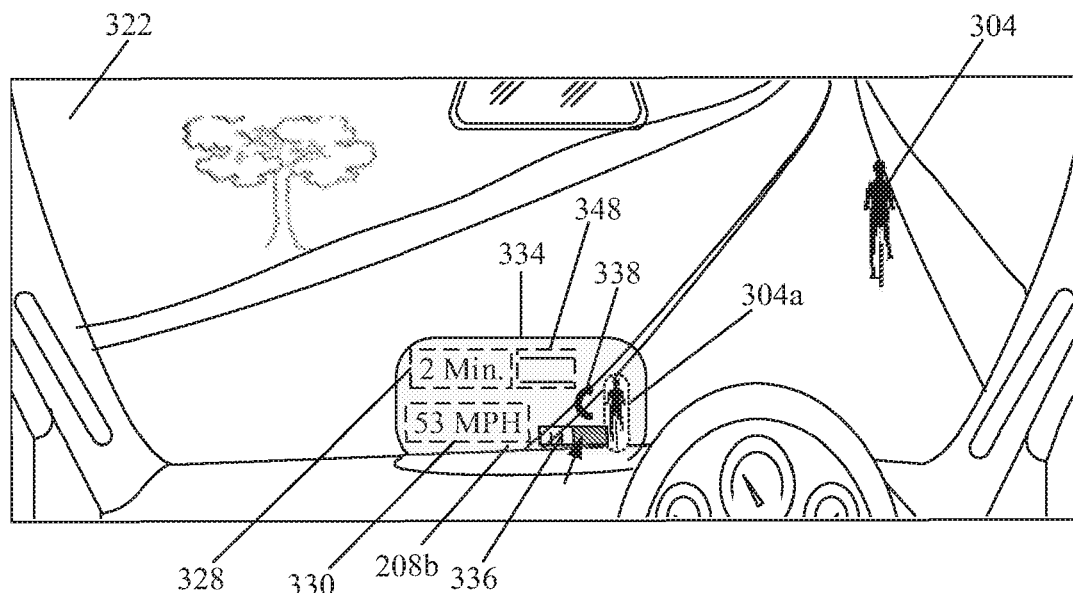

FIG. 3G shows display of the generated first alert in the HUD 334 instead of the AR-HUD 324 (as shown in FIG. 3F), in accordance with an embodiment. FIG. 3G is explained in conjunction with elements from FIGS. 1, 2, 3A, 3B, 3C, and 3F. With reference to FIG. 3G, there is further shown an area 348 that may display the current speed and the calculated target speed of the car 302, and the detected speed of the bicycle 304 as described in FIG. 3F.

The ECU 104 may generate a recommendation to reduce the speed of the car to the pre-defined threshold speed, such as "30 MPH". A change in the first sensor data, such as a change in the steering angle of the car 302, may be detected when the driver 114 of the car 302 maneuvers the car 302 away from the bicycle 304. A change in the speed of the car 302 may be detected. The ECU 104 may then generate the second alert (as shown in FIG. 3H) when the determined lateral distance 320 is above the first pre-defined threshold distance 116 and the determined relative speed is below the pre-defined threshold speed (such as "30 MPH" as shown in FIG. 3H).

Figure 3H:
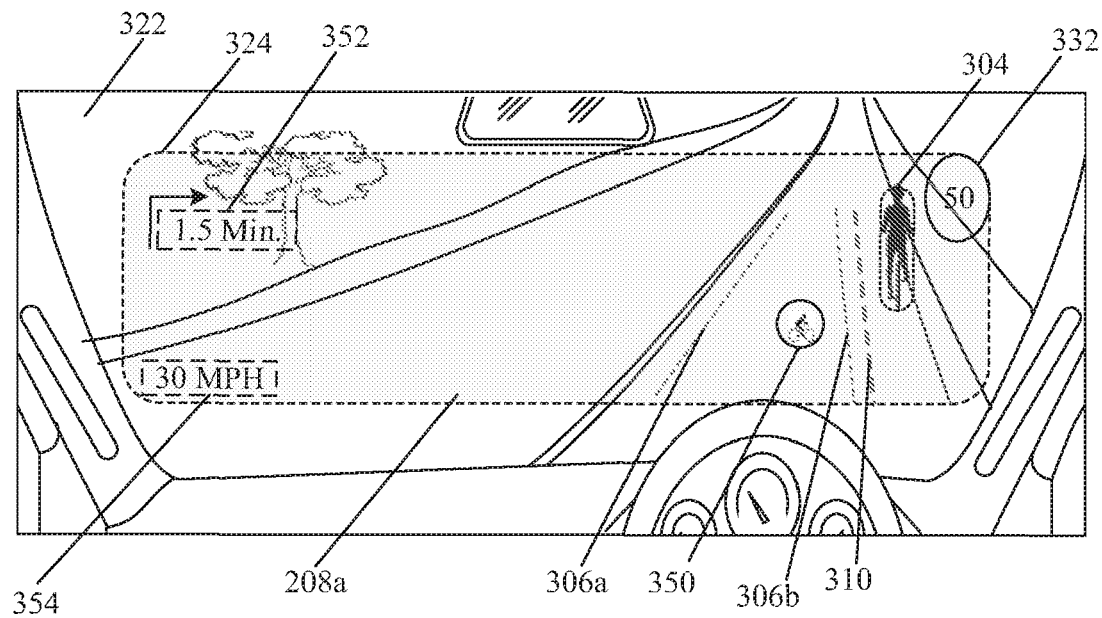

FIG. 3H shows an example of the generated second alert in the AR-HUD 324. FIG. 3D is explained in conjunction with elements from FIGS. 1, 2, 3A, 3B and 3C. With reference to FIG. 3D, there is further shown a second graphical icon 350, a second time period 352, a relative speed value 354, and the first predictive path 306 that may be updated and shown as the first boundary line 306a and the second boundary line 306b of the car 302. The second time period 352 may refer to a time period available with the driver 114 of the car 302 to pass the detected bicycle 304 along the updated first predictive path 306. The second time period 352 may be an updated when the car 302 is maneuvered away from the bicycle 304, and when the change in the speed of the car 302 is detected (as described in FIG. 3C). Similarly, the relative speed value 354 may refer to an updated relative speed between the car 302 and the detected bicycle 304, based on the detected change in the speed of the car 302.

The first predictive path 306 may accordingly be updated based on the change detected in the steering angle. The ECU 104 may be configured to control display of the generated second alert, such as the second graphical icon 350 in green color, on the AR-HUD 324. The color of the first boundary line 306a and the second boundary line (shown as a dashed lines), the marginal path 310 (also shown as a thick dashed line), and the boundary of the detected bicycle 304 (shown as a dotted line), may turn green from previously red to indicate the generated second alert. The second graphical icon 350 and a changed color of the first boundary line 306a, the second boundary line 306b, the marginal path 310, and the boundary of the detected bicycle 304 collectively, may represent the generated second alert. The generated second alert may indicate that the car 302 can safely pass the bicycle 304 along the updated first predictive path 306.

Figure 3I:
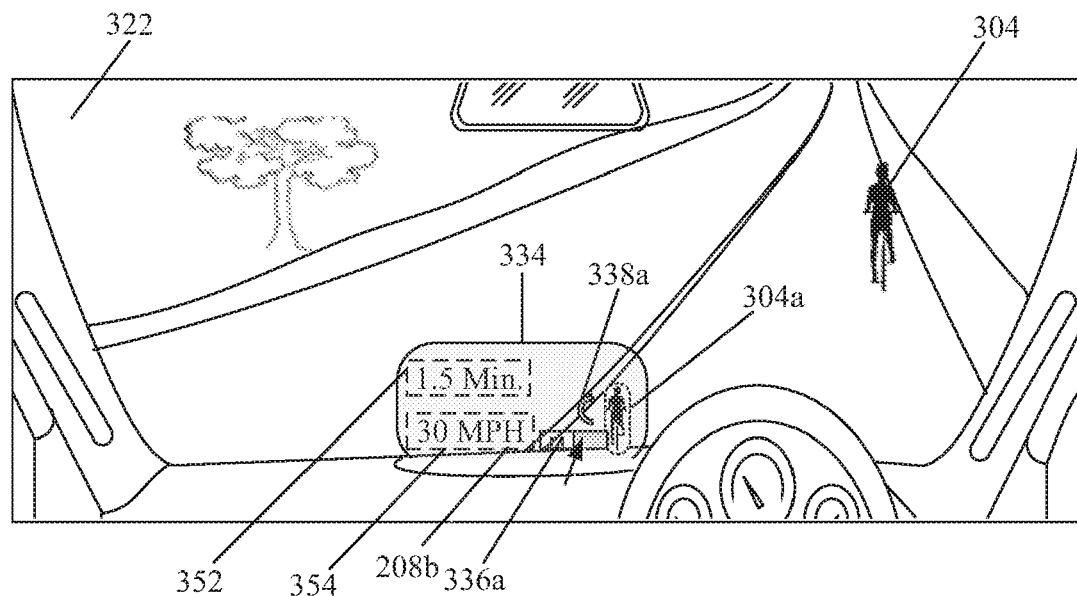

FIG. 3I shows an example of a different representation of the generated second alert in the HUD 334. FIG. 3I is explained in conjunction with elements from FIGS. 1, 2, 3A, 3C, 3E, 3G, and 3H. With reference to FIG. 3I, there is further shown an updated graphical bar 336a, an updated first overtake symbol 338a, the second time period 352, and the relative speed value 354. The updated graphical bar 336a and updated first overtake symbol 338a may be representative of a change in color, such as from red to green, to indicate a safe overtake. The second time period 352 and the relative speed value 354 correspond to updated values as described above for FIG. 3H. The generated second alert at the HUD 334, such as the green color of the updated first overtake symbol 338a, the updated graphical bar 336a, and the relative speed value 354, may indicate that the car 302 can safely pass the bicycle 304 along the updated first predictive path 306.

Figure 4A:
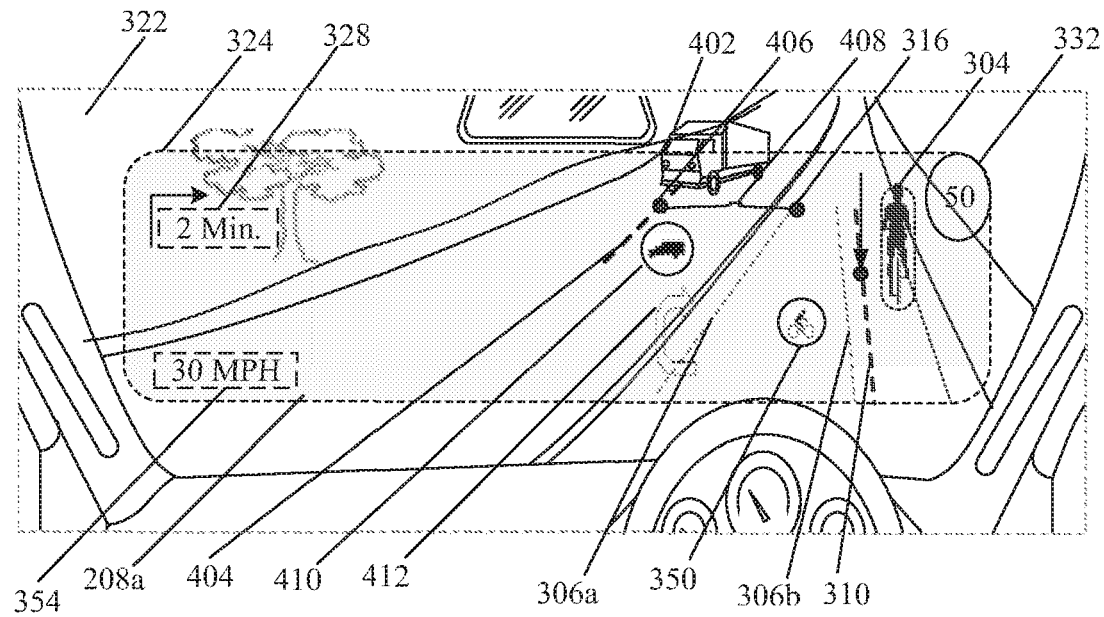
FIGS. 4A, 4B, and 4C illustrate a second exemplary scenario for implementation of the disclosed system and method to provide driving assistance to safely overtake a vehicle, in accordance with an embodiment of the disclosure.
Figure 4B:
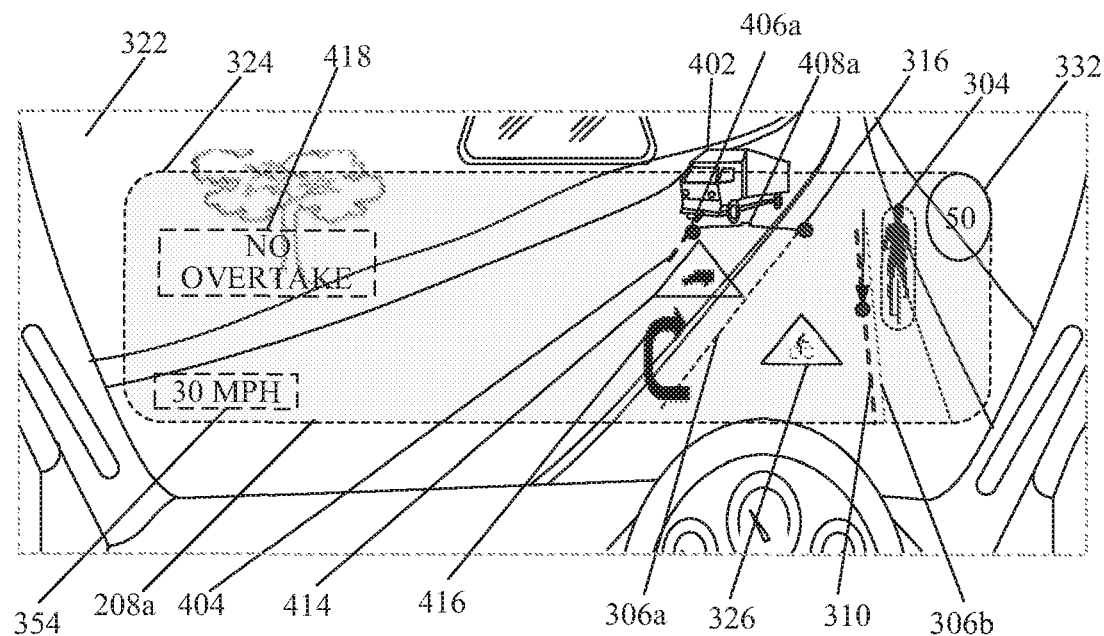
Figure 4C:
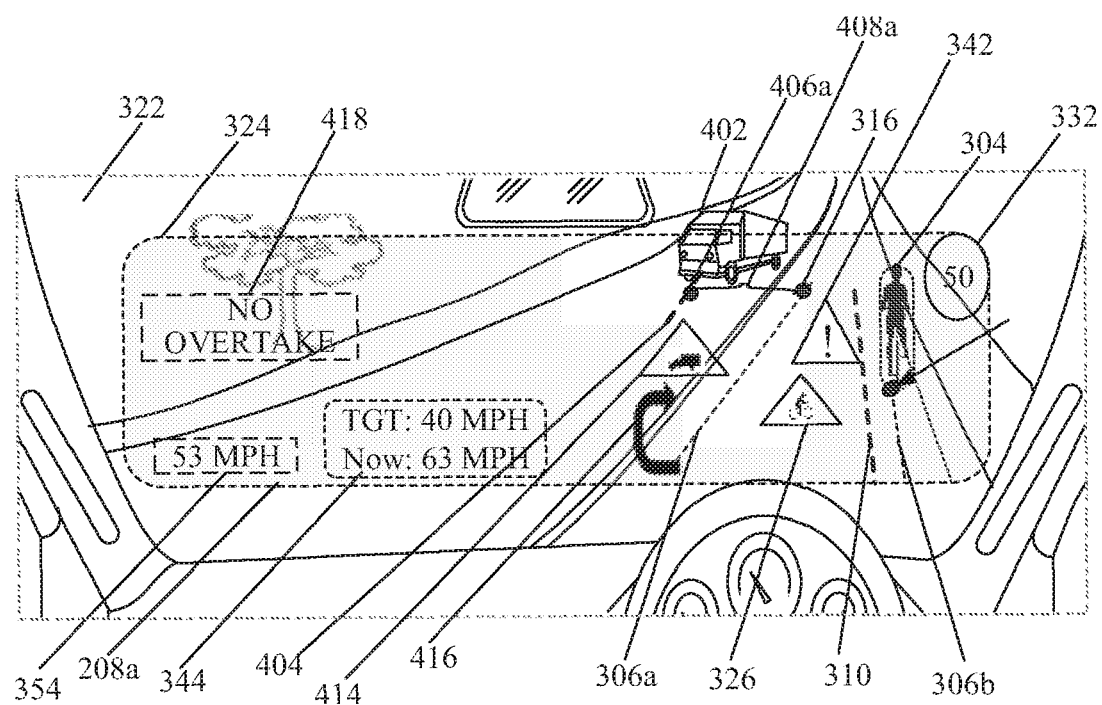

FIGS. 4A, 4B, and 4C illustrate a second exemplary scenario for implementation of the disclosed system and method to provide driving assistance to safely overtake a vehicle, in accordance with an embodiment of the disclosure. FIG. 4A is explained in conjunction with elements from FIGS. 1, 2, 3A, 3B, 3D, 3F, and 3H. With reference to FIG. 4A, there is further shown a truck 402, a third predictive path 404, a third position 406, a distance 408, a third graphical icon 410, and a second overtake symbol 412.

In accordance with the second exemplary scenario, in addition to the detected bicycle 304, the truck 402 may also be present in an adjacent lane. The truck 402 may be an oncoming traffic along the adjacent lane with respect to a direction of movement of the car 302. The truck 402 may correspond to the third vehicle (as described in FIGS. 1 and 2).

In operation, the current driving condition in the second exemplary scenario corresponds to an oncoming third vehicle, such as the truck 402. The truck 402 in the adjacent lane may be detected by the ECU 104. The first predictive path 306 is displayed as the two lines 306a and 306b. The first position 316 may be determined along the first predictive path 306, such as one of the boundary lines, such as the first boundary line 306a, that is closer to the detected third vehicle, such as the truck 402. Thus, the ECU 104 may determine the distance 408 between the third position 406 along the third predictive path 404 of the truck 402 and the determined first position 316 along the first boundary line 306a.

In certain instances, there may not be an oncoming vehicle in the adjacent lane, or there may be an oncoming vehicle but the determined lateral distance 320 between the car 302 and the bicycle 304 may be less than the first pre-defined threshold distance 116. The determination of the lateral distance 320 in such instances may occur when the first vehicle 106, such as the car 302, passes the second vehicle 108, such as the bicycle 304, at a distance above the other pre-defined threshold distance but less than the first pre-defined threshold distance 116. In such instances, the first position 316 (as shown by an arrow in FIG. 4A that points to a position along the second boundary line 306b) may be determined along the second boundary line 306b that is closer to the detected bicycle 304. Further, in such instances, the second position 318 may be the position of the detected bicycle 304 or a position along the second predictive path 308 of the detected bicycle 304 (not shown).

The ECU 104 may be further configured to determine whether the distance 408 between the third position 406 and the determined first position 316 is above the second pre-defined threshold distance. The third graphical icon 410 for the oncoming vehicle, such as the truck 402, represents that the first vehicle 106, such as the car 302, is at a safe distance, such as the second pre-defined threshold distance, with respect to the oncoming vehicle. The third graphical icon 410 may be displayed when the determined distance 408 is above the second pre-defined threshold distance.

The second overtake symbol 412 represents that the first vehicle 106, such as the car 302, is at a safe distance, such as the second pre-defined threshold distance, with respect to the detected oncoming vehicle and also at a safe distance, such as the first pre-defined threshold distance 116, with respect to the detected second vehicle 108, such as the bicycle 304. The third graphical icon 410 and the second overtake symbol 412 may be collectively referred to as the third alert. In presence of the oncoming vehicle, the first time period 328 may indicate a predicted duration to overtake the farthest detected vehicle with respect to the car 302. For example, the vertical distance of the truck 402 may be more than the detected bicycle 304. Thus, in this case, the first time period 328 may correspond to time to overtake the truck 402 along the first predictive path 306.

The ECU 104 may be configured to generate the third alert that may indicate that the car 302 can safely pass the detected bicycle 304 and the oncoming truck 402 along the current driving path, such as the two lines 306a and 306b that are representative of the first predictive path 306. The third alert may also indicate that the car 302 can safely pass the detected bicycle 304 and the oncoming truck 402 along the current driving path within the first time period 328 with a safe speed, such as the relative speed value 354 of "30 MPH". In accordance with an embodiment, the third alert may be an audio output, such as "Your current driving path is safe" and/or "The oncoming truck 402 is detected at a safe distance when you overtake the bicycle 304 along the displayed driving path (the first predictive path 306)".

FIG. 4B illustrates display of the generated fourth alert on the AR-HUD 324 in an example. FIG. 4B is explained in conjunction with elements from FIGS. 1, 2, 3A, 3B, 3D, 3F, 3H, and 4A. With reference to FIG. 4B, there is further shown an updated third position 406a, an updated distance 408a, an fourth graphical icon 414, and an third overtake symbol 416. In accordance with an embodiment, the ECU 104 may be configured to display the generated fourth alert.

The fourth graphical icon 414 for an oncoming vehicle represents that the car 302 may not be at a safe distance with respect to the oncoming vehicle, such as the truck 402. The fourth graphical icon 414 for the oncoming vehicle may be displayed when the updated distance 408a is below the second pre-defined threshold distance.

The third overtake symbol 416 represents that it may not be suitable for the car 302 to overtake the bicycle 304 along the current driving path of the car 302 when the updated distance 408a is below the second pre-defined threshold distance. In accordance with an embodiment, the alert message 418, such as "NO OVERTAKE", may also be displayed at the AR-HUD 324, via the UI 208a. The fourth graphical icon 414, the third overtake symbol 416, and the alert message 418 may collectively be referred to as the fourth alert.

In accordance with an embodiment, the fourth alert may be generated when the updated distance 408a is below the second pre-defined threshold distance. The fourth alert may be generated for a time instance that corresponds to predicted duration to overtake the bicycle 304 in presence of the oncoming vehicle, such as the truck 402. The updated distance 408a may be determined between the first position 316 (shown in the UI 208a as a point along the first boundary line 306a) and the updated third position 406a. The updated distance 408a may be determined based on the movement of the oncoming vehicle, such as the truck 402, towards the first vehicle 106, such as the car 302, or movement of the car 302 towards the truck 402.

FIG. 4C illustrates display of the generated first alert, the crash alert, and fourth alert on the AR-HUD 324 in an example. FIG. 4C is explained in conjunction with elements from FIGS. 1, 2, 3A, 3B, 3D, 3F, 3H, 4A, and 4B. With reference to FIG. 4C, there is shown the first graphical icon 326, the crash alert icon 342, the first speed information 344, the fourth graphical icon 414, the third overtake symbol 416, the alert message 418, and the relative speed value 354.

In an example, the first graphical icon 326, the first speed information 344, the relative speed value 354 and may indicate the first alert. Further, a change in color of the boundary around the detected bicycle 304 and its rider (shown as dotted lines), the first boundary line 306a, the second boundary line 306b, the marginal path 310, from previously green to yellow may also indicate the first alert. The crash alert icon 342 may indicate the crash alert. Further, an intersection of the second boundary line 306b with the boundary around the detected bicycle 304 and its rider (shown as dotted lines) may also indicate the crash alert. Further, a change in color of the boundary around the detected bicycle 304 and its rider, the first boundary line 306a, the second boundary line 306b, the marginal path 310, from previously green to red may also indicate the crash alert. Alternatively, a continuous blinking of the crash alert icon 342, the second boundary line 306b, and the boundary around the detected bicycle 304, and a buzzer sound may also indicate the crash alert. The third overtake symbol 416 and/or the alert message 418, such as "NO OVERTAKE", may indicate the fourth alert. The color of the third overtake symbol 416 may turn yellow from previously green or red to indicate the fourth alert. The first alert, the crash alert, and the fourth alert may correspond to potential danger alerts, whereas the second alert and the third alert correspond to safety alerts. The second alert and the third alert are collectively shown and described in FIG. 4A.

As the alerts are generated and displayed much before the actual overtake occurs, the driver 114 can preemptively adjust the speed and suitably maneuver the car 302. The displayed predictive paths, such as the first predictive path 306 (represented by the first boundary line 306a and the second boundary line 306b by use of the UI 208a), the second predictive path 308, the marginal path 310, and/or the third predictive path 404, may make it easier for the driver 114 to overtake the second vehicle 108, such as the bicycle 304 both in presence or absence of the oncoming vehicle, such as the truck 402. Thus, an enhanced assistance may be provided to ensure a safe overtake in different traffic conditions and avoidance of a traffic rule violation.

Figure 5A:
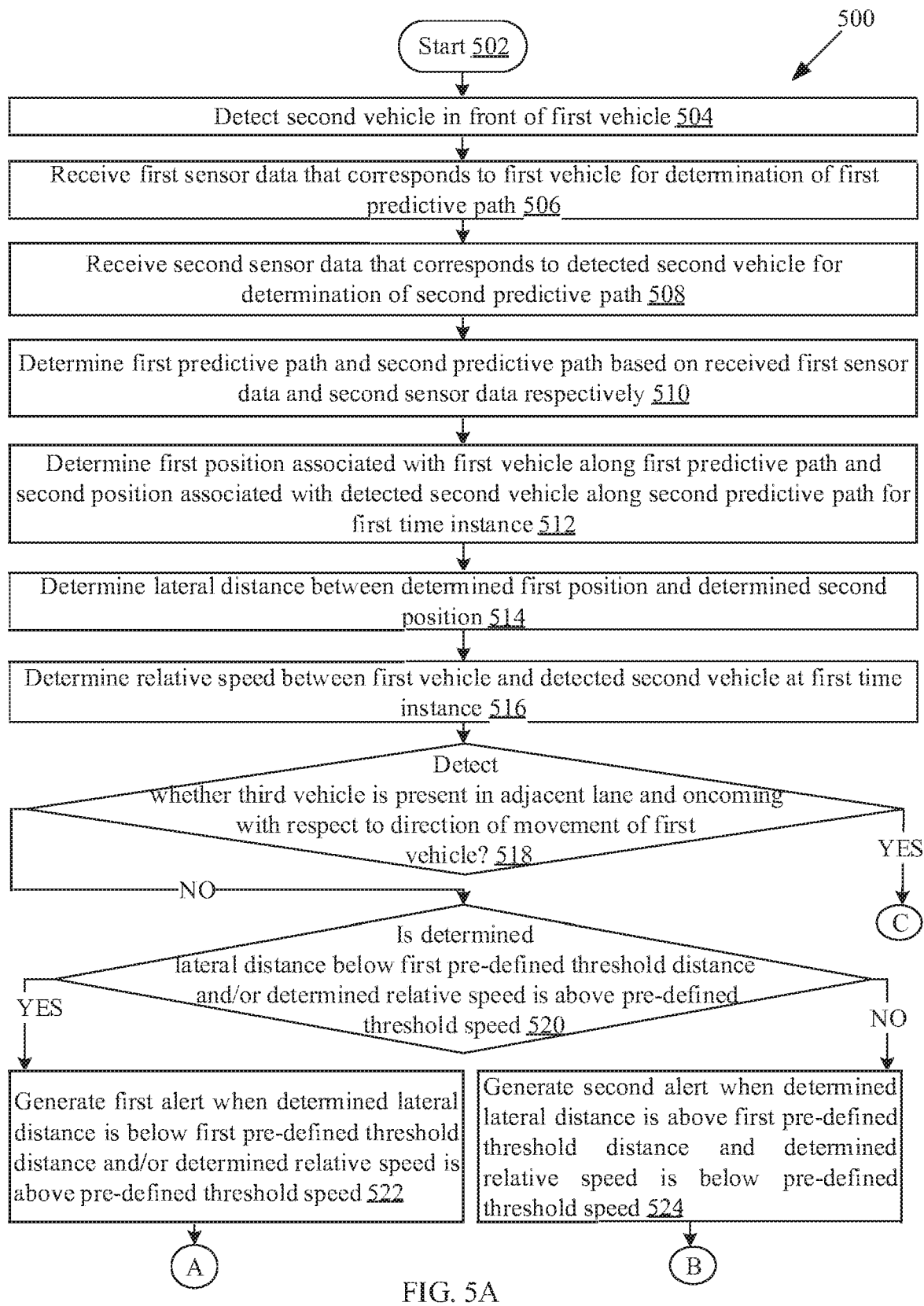
FIGS. 5A and 5B collectively depict a first flow chart that illustrates an exemplary method to provide driving assistance to safely overtake a vehicle, in accordance with an embodiment of the disclosure.
Figure 5B:
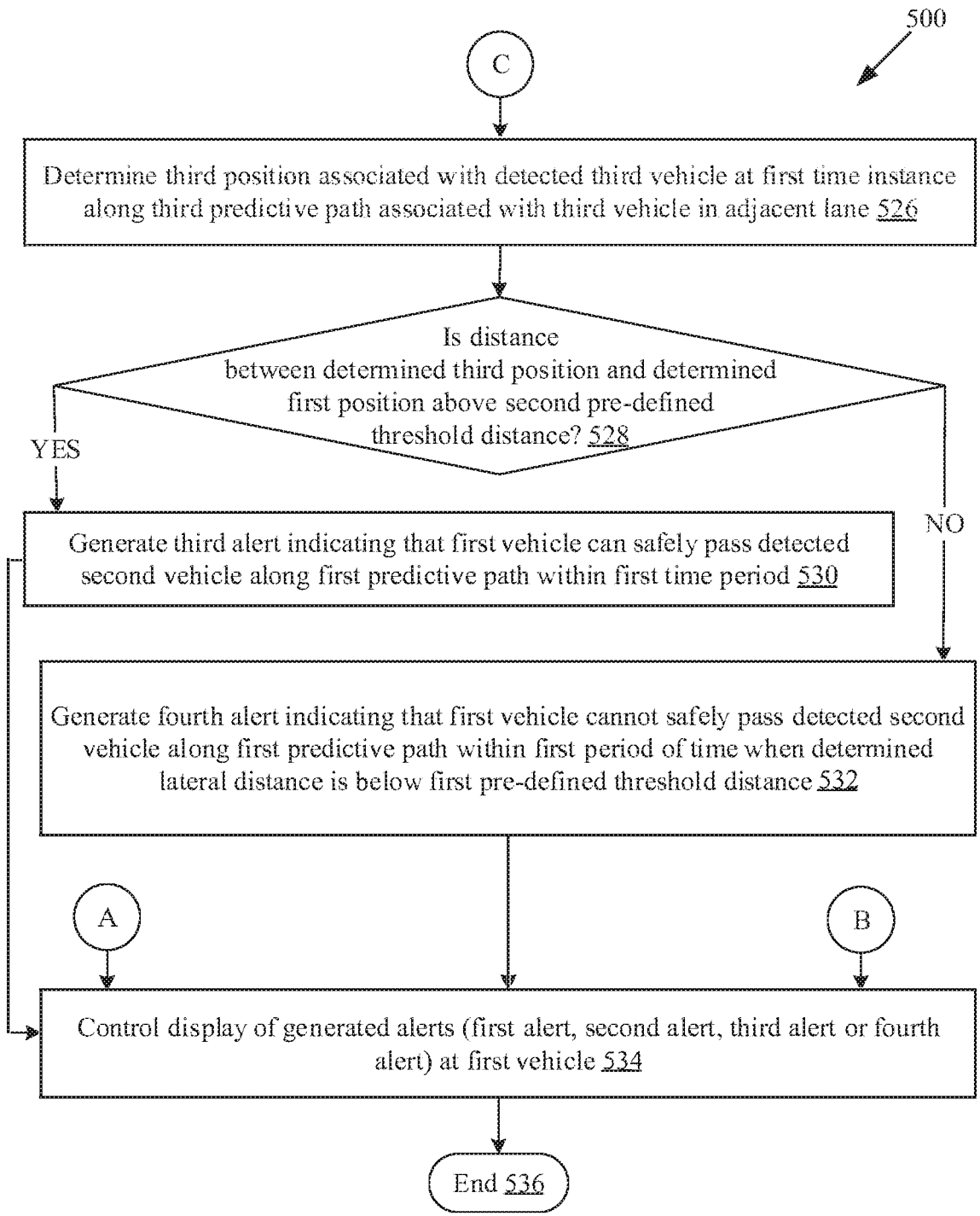

FIGS. 5A and 5B collectively depict a flow chart 500 that illustrates an exemplary method to provide driving assistance to safely overtake a vehicle, in accordance with an embodiment of the disclosure. The flow chart 500 is described in conjunction with FIGS. 1, 2, 3A, 3B, 3C, 3D, 3E, 3F, 3G, 3H, 3I, 4A, 4B and 4C. The method starts at step 502 and proceeds to step 504.

At step 504, the second vehicle 108 (such as the bicycle 304) may be detected in front of the first vehicle 106 (such as the car 302). At step 506, the first sensor data that corresponds to the first vehicle 106 may be received. At step 508, the second sensor data that corresponds to detected second vehicle 108 may be received. At step 510, the first predictive path 306 may be determined based on received first sensor data (as shown in FIG. 3A). In accordance with an embodiment, the determined first predictive path 306 may be also represented as two boundary lines, such as the first boundary line 306a and the second boundary line 306b on the AR-HUD 324 (as shown and described in FIGS. 3B, 3D, 3E, 3F, 4A, 4B, and 4C). The second predictive path 308 may be determined based on the received second sensor data (as shown in FIG. 3A).

At step 512, the first position 316 associated with first vehicle 106 may be determined. The second position 318 associated with the detected second vehicle 108 may be further determined. The first position 316 may be determined along the first predictive path 306 (as shown in FIG. 3A). The second position 318 may be determined along the second predictive path 308 (as shown in FIG. 3A). In accordance with an embodiment, the second position 318 may correspond to the position of the detected second vehicle 108. In such an embodiment, the second predictive path 308 may not be determined. At step 514, the lateral distance 320 between the determined first position 316 and the determined second position 318, may be determined (as shown in FIG. 3A).

At step 516, a relative speed (such as the relative speed value 354) between the first vehicle 106 and the detected second vehicle 108 for the first time instance, may be determined. At step 518, whether a third vehicle, such as the truck 402, is present in an adjacent lane, may be detected. The adjacent lane may correspond to oncoming traffic with respect to a direction of movement of the first vehicle 106. In instances when the second vehicle 108 is detected and the third vehicle is not detected, the control may pass to the step 520. In instances when the third vehicle is detected in addition to the detected second vehicle 108, the control may pass to the step 526.

At step 520, whether the determined lateral distance 320 is below the first pre-defined threshold distance 116 and/or the determined relative speed is above the pre-defined threshold speed, may be determined. In instances when the determined lateral distance 320 is below the first pre-defined threshold distance 116, such as the safe distance (such as 3 or 4 feet) and/or determined relative speed is above the pre-defined threshold speed, such as "30 MPH", the control may pass to the step 522. In instances when the determined lateral distance 320 is above the first pre-defined threshold distance 116, and the determined relative speed is below the pre-defined threshold speed, the control may pass to the step 524.

At step 522, a first alert may be generated. The first alert may indicate that the first vehicle 106 cannot safely pass the detected second vehicle 108 along the first predictive path 306. An example of the first alert is shown in FIGS. 3B, 3C, 3F, and 3G. The control may then pass to the step 534. At step 524, a second alert may be generated. The second alert may indicate that the first vehicle 106 can safely pass the detected second vehicle 108 along the first predictive path 306. An example of the second alert is shown in FIGS. 3H and 3I. The control may then pass to the step 534.

In accordance with an embodiment, instead of the determination of the relative speed between first vehicle 106 and detected second vehicle 108 as described in the steps 516, 520, 522, and 524 in FIG. 5A, an absolute speed of the first vehicle 106 may be used to determine if the first vehicle can safely pass the second vehicle 108. In this case, the absolute speed of the first vehicle 106 is compared with another pre-defined threshold speed and the first alert is issued if the absolute speed of the first vehicle 106 is above the other pre-defined threshold speed. On the other hand, if the absolute speed of the first vehicle 106 is less than the other pre-defined threshold speed and determined lateral distance, such as the lateral distance 320, is above the first pre-defined threshold distance 116, the second alert is issued.

As described above, the first alert may indicate that the first vehicle 106 cannot safely pass the detected second vehicle 108 along the first predictive path 306, because a predictive distance, such as the lateral distance 320, between the first vehicle 106 and second vehicle 108 when the first vehicle 106 passes the second vehicle 108 is shorter than the first pre-defined threshold distance 116, such as a distance regulated by a law. Further as described above, the first alert may indicate that the first vehicle 106 cannot safely pass the detected second vehicle 108 along the first predictive path 306, because the speed (the absolute speed or the relative speed) of the first vehicle 106 when the first vehicle 106 passes the second vehicle 108 is high, such as above a speed threshold regulated by a law. The second alert may indicate that the first vehicle 106 can safely pass the detected second vehicle 108 along the first predictive path 306, because a predictive distance, such as the lateral distance 320, between the first vehicle 106 and second vehicle 108 when the first vehicle 106 passes the second vehicle 108 is more than a pre-defined distance, such as a distance regulated by a law and a speed of the first vehicle when the first vehicle 106 passes the second vehicle 108 is low enough for safety for the second vehicle 108.

At step 526, a third position, such as the third position 406, associated with detected third vehicle may be determined. In accordance with an embodiment, the third position 406 may be determined along the third predictive path 404, associated with the third vehicle in the adjacent lane. At step 528, whether the distance between determined third position 406, and determined first position 316, are above the second pre-defined threshold distance, may be determined.

In instances when the distance is above the second pre-defined threshold distance, the control passes to step 530. In instances when the distance 408 is below the second pre-defined threshold distance, the control passes to step 532. At step 530, a third alert may be generated. The generated third alert may indicate that the first vehicle 106 can safely pass the detected second vehicle 108 and the third vehicle along the first predictive path 306 within the first time period. An example of the third alert is shown in FIG. 4A. The control may then pass to the step 534.

At step 532, a fourth alert may be generated. The fourth alert may indicate that the first vehicle 106 cannot safely pass the detected second vehicle 108 and the third vehicle along the first predictive path 306 within the first period of time. An example of the fourth alert is shown in FIG. 4B. At step 534, the display of the generated alerts, such as the first alert, the second alert, the third alert or the fourth alert, may be controlled at the first vehicle 106. The display of the generated alerts may be controlled via the UI 208a (FIG. 2). Example of the display of the generated alerts on the AR-HUD 324 via the UI 208a (one of the UI 208a) is shown and described in FIGS. 3B, 3D, 3F, 3H, 4A, 4B, and 4C). Similarly, example of the display of the generated alerts on the HUD 334, via the UI 208b (another UI of the UI 208a) is shown and described in FIGS. 3C, 3E, 3G, and 3I). Control passes to end step 536.

Figure 6A:
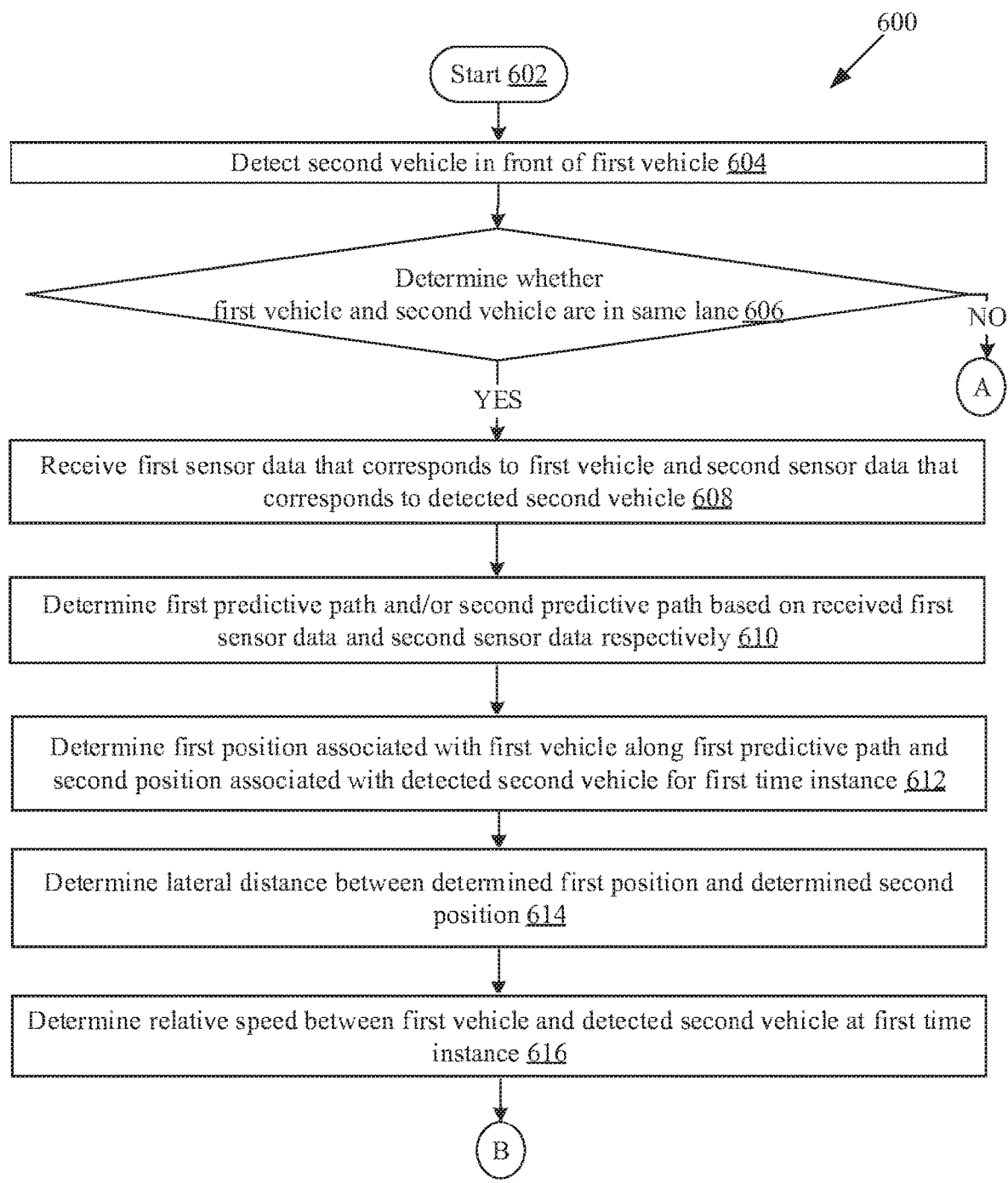
FIGS. 6A and 6B collectively depict a second flow chart that illustrates another exemplary method to provide driving assistance to safely overtake a vehicle, in accordance with an embodiment of the disclosure.
Figure 6B:
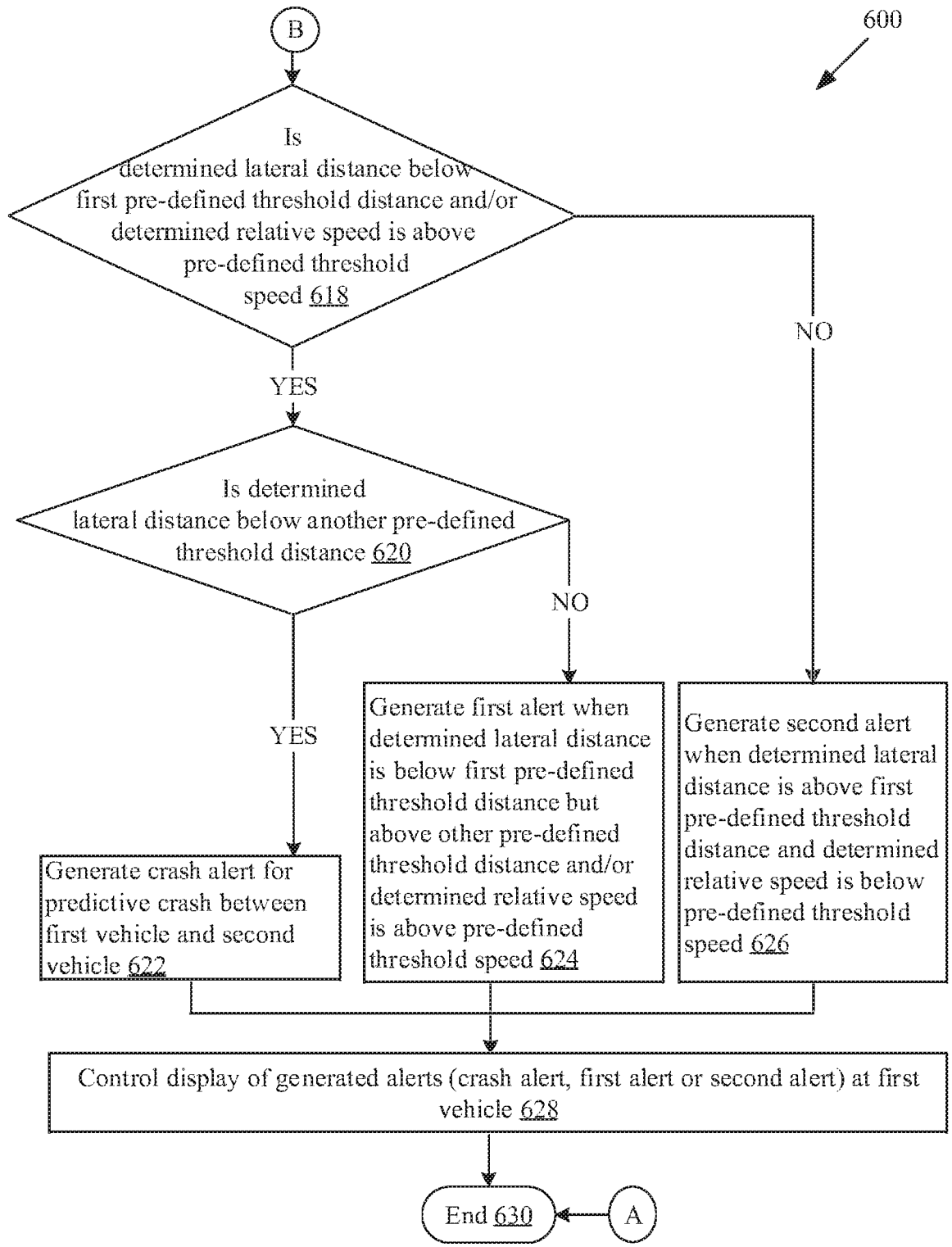

FIGS. 6A and 6B collectively depict a second flow chart 600 that illustrates another exemplary method to provide driving assistance to safely overtake a vehicle, in accordance with an embodiment of the disclosure. The flow chart 600 is described in conjunction with FIGS. 1, 2, 3A, 3B, 3C, 3D, 3E, 3F, 3G, 3H, 3I, 4A, 4B, 4C, 5A and 5B. The method starts at step 602 and proceeds to step 604.

At step 604, the second vehicle 108 (such as an EPAMD or the bicycle 304) may be detected in front of the first vehicle 106 (such as the car 302). At step 606, it may be determined whether the first vehicle 106 and the second vehicle 108 are in a same lane. In instances when the first vehicle 106 and the second vehicle 108 are in the same lane of a road, the control passes to step 608. In instances when the first vehicle 106 and the second vehicle 108 are not in the same lane, the control passes to the end step 630.

At step 608, the first sensor data that corresponds to the first vehicle 106 and the second sensor data that corresponds to the second vehicle 108 may be received. In accordance with an embodiment, the first sensor data and the second sensor data may be received at intermittent time intervals, such as every 10 milliseconds. At step 610, the first predictive path 306 and/or second predictive path may be determined. The first predictive path 306 may be determined based on received first sensor data. The second predictive path may be determined based on the received second sensor data.

At step 612, the first position 316 associated with the first vehicle 106 may be determined. The second position 318 associated with the detected second vehicle 108 may be further determined. The first position 316 may be determined along the first predictive path 306 (as shown in FIG. 3A). The second position 318 may correspond to the position of the second vehicle 108 that may be detected continuously or intermittently, such as every 10 milliseconds. In accordance with an embodiment, the second position 318 may be determined along the second predictive path 308 (as shown in FIG. 3A). In accordance with an embodiment, the first position 316 and the second position 318 may be determined simultaneously.

Steps 614 and 616 may be similar to the steps 514 and 516 (FIG. 5A), respectively. At step 614, the lateral distance 320 between the determined first position 316 and the determined second position 318, may be determined (as shown in FIG. 3A). At step 616, a relative speed (such as the relative speed value 354) between the first vehicle 106 and the detected second vehicle 108 for the first time instance, may be determined.

At step 618, it may be determined whether the lateral distance 320 is below the first pre-defined threshold distance 116 and/or the determined relative speed is above the pre-defined threshold speed. In instances when the determined lateral distance 320 is below the first pre-defined threshold distance 116 and/or the determined relative speed is above the pre-defined threshold speed, the control passes to step 620. In instances when the determined lateral distance 320 is above the first pre-defined threshold distance 116 and/or the determined relative speed is below the pre-defined threshold speed, the control passes to step 626.

At step 620, it may be determined whether the lateral distance 320 is below another pre-defined threshold distance. In instances when the determined lateral distance 320 is below the other pre-defined threshold distance, the control passes to step 622. In instances when the determined lateral distance 320 is below first pre-defined threshold distance 116, but above other pre-defined threshold distance and/or the determined relative speed is above pre-defined threshold speed, the control passes to step 624.

At step 622, a crash alert for a predictive crash between the first vehicle 106 and the second vehicle 108 may be generated. An example of the crash alert is shown in FIGS. 3D and 3E. The control may then pass to the step 628. At step 624, the first alert may be generated, as described previously in the step 522. The first alert may indicate that the first vehicle 106 cannot safely pass the detected second vehicle 108 along the first predictive path 306. An example of the first alert is shown in FIGS. 3B, 3C, 3F, and 3G. The control may then pass to the step 628.

At step 626, the second alert may be generated. The second alert, as described previously in the step 524, may indicate that the first vehicle 106 can safely pass the detected second vehicle 108 along the first predictive path 306. An example of the second alert is shown in FIGS. 3H and 3I. The control may then pass to the step 628.

At step 628, the display of the generated alerts, such as the crash alert, the first alert and the second alert, may be controlled at the first vehicle 106. The display of the generated alerts, may be similar to that as described in the step 534 (FIG. 5B). The control passes to end step 630.

In accordance with an embodiment of the disclosure, a system to provide driving assistance to safely overtake a vehicle is disclosed. The system (such as the ECU 104 (FIG. 1) may comprise one or more circuits (hereinafter referred to as the microprocessor 202 (FIG. 2)). The microprocessor 202 may be configured to detect the second vehicle 108 in front of the first vehicle 106 (FIG. 1). The microprocessor 202 may be configured to determine a first position associated with the first vehicle 106, and a second position associated with the detected second vehicle 108. Such determination may occur at a first time instance. The microprocessor 202 may be configured to determine whether a lateral distance between the determined first position and the determined second position are below the first pre-defined threshold distance 116. The microprocessor 202 may be configured to generate the first alert when the determined lateral distance is below the first pre-defined threshold distance 116 (FIG. 1).

In accordance with an embodiment of the disclosure, a vehicle (such as the first vehicle 106 (FIGS. 1 and 2) to provide driving assistance to safely overtake another vehicle (such as the second vehicle 108 (FIG. 1)) is disclosed. The vehicle may comprise the battery 222 and the display 208. The vehicle may further comprise one or more vehicle sensors (such as the sensing system 212 (FIG. 2)), configured to detect the other vehicle in front of the vehicle. The vehicle may further comprise an electronic control unit (such as the ECU 104 (FIGS. 1 and 2)) that comprises one or more circuits (hereinafter referred to as the microprocessor 202 (FIG. 2) configured to determine a first position associated with the vehicle and a second position associated with the detected other vehicle for a first time instance. The microprocessor 202 may be configured to determine whether a lateral distance between the determined first position and the determined second position is below a first pre-defined threshold distance. The microprocessor 202 may be configured to generate a first alert when the determined lateral distance is below the first pre-defined threshold distance. The generated first alert may be displayed on the display which is powered by the battery 222.

Various embodiments of the disclosure may provide a non-transitory computer readable medium and/or storage medium having stored thereon, a set of computer-executable instructions to cause a machine and/or a computer to provide driving assistance to safely overtake a vehicle. The set of computer-executable instructions in an ECU may cause the machine and/or computer to perform the steps that comprise detection of the second vehicle 108 in front of the first vehicle 106. A first position associated with the first vehicle 106 and a second position associated with the detected second vehicle 108, may be determined. Such determination may occur at a first time instance. It may be determined whether a lateral distance between the determined first position and the determined second position is below a first pre-defined threshold distance 116. A first alert may be generated when the determined lateral distance is below the first pre-defined threshold distance 116.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A driving assistance system, comprising:
   at least one circuit in an electronic control unit of a first vehicle, wherein said at least one circuit is configured to:
   detect a second vehicle in front of said first vehicle;
   determine a first position associated with said first vehicle and a second position associated with said detected second vehicle for a first time instance;
   determine whether a lateral distance between said determined first position and said determined second position is below a first threshold distance;
   detect a geo-location of said first vehicle, wherein said geo-location of said first vehicle is detected in a jurisdiction; and
   control at least one component of said first vehicle based on said determination that said lateral distance is below said first threshold distance,
   wherein said first threshold distance is based on a rule in said jurisdiction of said detected geo-location of said first vehicle.

2. The driving assistance system according to claim 1, wherein said first vehicle is a motor vehicle and said detected second vehicle is one of a bicycle, an electric personal assistive mobility device (EPAMD), a motorcycle, a vehicle propelled by human power, or other non-motorized vehicle.

3. The driving assistance system according to claim 1, wherein said first time instance corresponds to a time instance at which said first vehicle is predicted to pass said detected second vehicle.

4. The driving assistance system according to claim 1, wherein said at least one circuit is further configured to determine whether a relative speed between said first vehicle and said detected second vehicle at said first time instance is above a threshold speed.

5. The driving assistance system according to claim 4, wherein said at least one circuit is further configured to generate an alert based on said relative speed above said threshold speed.

6. The driving assistance system according to claim 4, wherein said at least one circuit is further configured to determine:
   said first position along a first predictive path associated with said first vehicle, and
   said second position along a second predictive path associated with said detected second vehicle.

7. The driving assistance system according to claim 6, wherein said at least one circuit is further configured to:
   receive first sensor data corresponding to said first vehicle for determination of said first predictive path; and
   receive second sensor data corresponding to said detected second vehicle for determination of said second predictive path.

8. The driving assistance system according to claim 1, wherein said at least one circuit is further configured to dynamically update said first threshold distance based on a relative speed between said first vehicle and said detected second vehicle.

9. The driving assistance system according to claim 1, wherein a third position is associated with a third vehicle at a second time instance along a third predictive path associated with said third vehicle.

10. The driving assistance system according to claim 9, wherein said at least one circuit is further configured to determine whether a distance between said third position and said determined first position is above a second threshold distance.

11. The driving assistance system according to claim 10, wherein said at least one circuit is further configured to generate an alert based on said distance between said third position and said determined first position, wherein said alert indicates whether said first vehicle is able to pass said detected second vehicle along a specific path.

12. The driving assistance system according to claim 11, wherein said first time instance is determined based on at least one of said lateral distance, said first threshold distance, a relative speed between said first vehicle and said detected second vehicle, a threshold speed, said distance between said determined third position and said determined first position, or said second threshold distance.

13. The driving assistance system according to claim 1, wherein said at least one circuit is further configured to generate an alert based on said determination that said lateral distance is below said first threshold distance and said lateral distance is above a second threshold distance.

14. The driving assistance system according to claim 1, wherein a crash alert is generated based on said lateral distance that is below a second threshold distance.

15. The driving assistance system according to claim 1, wherein said controlled at least one component of said first vehicle based on said determination that said lateral distance is below said first threshold distance is at least one of a powertrain control component, a steering component, a braking component, a sensing component, or a body control component.

16. The driving assistance system according to claim 1, wherein said at least one circuit is further configured to control said at least one component of said first vehicle based on said lateral distance to safely overtake said second vehicle.

17. The driving assistance system according to claim 16, wherein said controlled at least one component of said first vehicle based on said determination that said lateral distance is below said first threshold distance is at least one of a powertrain control component, steering component, a braking component, a sensing component, or a body control component.

18. A method, comprising:
   in a first vehicle:
      detecting a second vehicle in front of said first vehicle;
      determining a first position associated with said first vehicle and a second position associated with said detected second vehicle for a first time instance;
      determining whether a lateral distance between said determined first position and said determined second position is below a first threshold distance;
      detecting a geo-location of said first vehicle, wherein said geo-location of said first vehicle is detected in a jurisdiction; and
      controlling at least one component of said first vehicle based on said determination that said lateral distance is below said first threshold distance,
         wherein said first threshold distance is based on a rule in said jurisdiction of said detected geo-location of said first vehicle.

19. A non-transitory computer-readable medium having stored thereon computer-executable instructions that, when executed by a computer, cause said computer in a first vehicle to execute operations, said operations comprising:
   detecting a second vehicle in front of said first vehicle;
   determining a first position associated with said first vehicle and a second position associated with said detected second vehicle for a first time instance;
   determining whether a lateral distance between said determined first position and said determined second position is below a first threshold distance;
   detecting a geo-location of said first vehicle, wherein said geo-location of said first vehicle is detected in a jurisdiction; and
   controlling at least one component of said first vehicle based on said determination that said lateral distance is below said first threshold distance,
   wherein said first threshold distance is based on a rule in said jurisdiction of said detected geo-location of said first vehicle.

* * * * *